US012513682B2

(12) United States Patent
Awoniyi-Oteri et al.

(10) Patent No.: US 12,513,682 B2
(45) Date of Patent: Dec. 30, 2025

(54) SEMI-PERSISTENT SCHEDULING ACTIVATION AND DEACTIVATION

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Wanshi Chen, San Diego, CA (US); Peter Gaal, San Diego, CA (US); Jelena Damnjanovic, Del Mar, CA (US); Juan Montojo, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 18/188,794

(22) Filed: Mar. 23, 2023

(65) Prior Publication Data
US 2023/0354292 A1 Nov. 2, 2023

Related U.S. Application Data

(60) Provisional application No. 63/363,934, filed on Apr. 29, 2022, provisional application No. 63/363,928, filed on Apr. 29, 2022, provisional application No. 63/363,921, filed on Apr. 29, 2022.

(51) Int. Cl.
H04W 72/11 (2023.01)
H04L 1/1829 (2023.01)
H04W 72/232 (2023.01)

(52) U.S. Cl.
CPC .......... *H04W 72/11* (2023.01); *H04L 1/1854* (2013.01); *H04W 72/232* (2023.01)

(58) Field of Classification Search
CPC .......... H04W 72/11; H04W 72/23–232; H04L 1/1854
See application file for complete search history.

(56) References Cited

U.S. PATENT DOCUMENTS

| 2021/0184812 | A1* | 6/2021 | MolavianJazi | H04W 72/044 |
| 2021/0212036 | A1* | 7/2021 | Wu | H04L 5/0053 |
| 2021/0336727 | A1* | 10/2021 | Miao | H04L 1/1819 |
| 2021/0345397 | A1* | 11/2021 | Li | H04L 1/1822 |
| 2022/0149997 | A1* | 5/2022 | Wang | H04L 1/1822 |
| 2023/0269741 | A1* | 8/2023 | Li | H04L 1/1896 370/329 |
| 2023/0292314 | A1* | 9/2023 | Chin | H04W 72/1268 |
| 2024/0259871 | A1* | 8/2024 | Wang | H04W 72/231 |

* cited by examiner

*Primary Examiner* — Kevin C. Harper
(74) *Attorney, Agent, or Firm* — Harrity & Harrity, LLP

(57) ABSTRACT

Various aspects of the present disclosure generally relate to wireless communication. In some aspects, a user equipment (UE) may receive a first packet and a second packet for transmission during a period for a periodic application. The UE may transmit the first packet and the second packet in a combination of a dynamic grant and a configured grant occasion. In some aspects, a network entity may receive a first packet and a second packet for transmission. The network entity may transmit the first packet and the second packet in a combination of a dynamic grant and a semi-persistent scheduling occasion. Numerous other aspects are described.

30 Claims, 23 Drawing Sheets

SEMI-PERSISTENT SCHEDULING ACTIVATION AND DEACTIVATION

CROSS-REFERENCE TO RELATED APPLICATION

This patent application claims priority to: U.S. Provisional Patent Application No. 63/363,921, filed on Apr. 29, 2022; U.S. Provisional Patent Application No. 63/363,934, filed on Apr. 29, 2022; and U.S. Provisional Patent Application No. 63/363,928, filed on Apr. 29, 2022—each assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for scheduling resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a first packet and a second packet for transmission during a period for a periodic application. The method may include transmitting the first packet and the second packet in a combination of a dynamic grant and a configured grant (CG) occasion.

Some aspects described herein relate to a method of wireless communication performed by a UE. The method may include receiving downlink control information (DCI) that indicates a dynamic grant. The method may include receiving a first packet and a second packet for a periodic application in a combination of the dynamic grant and a semi-persistent scheduling (SPS) occasion during a period for the periodic application.

Some aspects described herein relate to a method of wireless communication performed by a network entity. The method may include receiving a first packet and a second packet for transmission during a period for a periodic application. The method may include transmitting the first packet and the second packet in a combination of a dynamic grant and an SPS occasion.

Some aspects described herein relate to a UE for wireless communication. The UE may include a memory and one or more processors coupled to the memory. The one or more processors may be configured to receive a first packet and a second packet for transmission during a period for a periodic application. The one or more processors may be configured to transmit the first packet and the second packet in a combination of a dynamic grant and a CG occasion.

Some aspects described herein relate to a UE for wireless communication. The UE may include a memory and one or more processors coupled to the memory. The one or more processors may be configured to receive DCI that indicates a dynamic grant. The one or more processors may be configured to receive a first packet and a second packet for a periodic application in a combination of the dynamic grant and an SPS occasion during a period for the periodic application.

Some aspects described herein relate to a network entity for wireless communication. The network entity may include a memory and one or more processors coupled to the memory. The one or more processors may be configured to receive a first packet and a second packet for transmission during a period for a periodic application. The one or more processors may be configured to transmit the first packet and the second packet in a combination of a dynamic grant and an SPS occasion.

Some aspects described herein relate to a non-transitory computer-readable medium that stores a set of instructions for wireless communication by a UE. The set of instructions, when executed by one or more processors of the UE, may cause the UE to receive a first packet and a second packet for transmission during a period for a periodic application. The set of instructions, when executed by one or more processors of the UE, may cause the UE to transmit the first packet and the second packet in a combination of a dynamic grant and a CG occasion.

Some aspects described herein relate to a non-transitory computer-readable medium that stores a set of instructions for wireless communication by an UE. The set of instructions, when executed by one or more processors of the UE, may cause the UE to receive DCI that indicates a dynamic grant. The set of instructions, when executed by one or more processors of the UE, may cause the UE to receive a first packet and a second packet for a periodic application in a combination of the dynamic grant and an SPS occasion during a period for the periodic application.

Some aspects described herein relate to a non-transitory computer-readable medium that stores a set of instructions for wireless communication by a network entity. The set of instructions, when executed by one or more processors of the network entity, may cause the network entity to receive a first packet and a second packet for transmission during a period for a periodic application. The set of instructions, when executed by one or more processors of the network entity, may cause the network entity to transmit the first packet and the second packet in a combination of a dynamic grant and an SPS occasion.

Some aspects described herein relate to an apparatus for wireless communication. The apparatus may include means for receiving a first packet and a second packet for transmission during a period for a periodic application. The apparatus may include means for transmitting the first packet and the second packet in a combination of a dynamic grant and a CG occasion.

Some aspects described herein relate to an apparatus for wireless communication. The apparatus may include means for receiving DCI that indicates a dynamic grant. The apparatus may include means for receiving a first packet and a second packet for a periodic application in a combination of the dynamic grant and an SPS occasion during a period for the periodic application.

Some aspects described herein relate to an apparatus for wireless communication. The apparatus may include means for receiving a first packet and a second packet for transmission during a period for a periodic application. The apparatus may include means for transmitting the first packet and the second packet in a combination of a dynamic grant and an SPS occasion.

Aspects generally include a method, apparatus, system, computer program product, non-transitory computer-readable medium, UE, base station, network entity, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
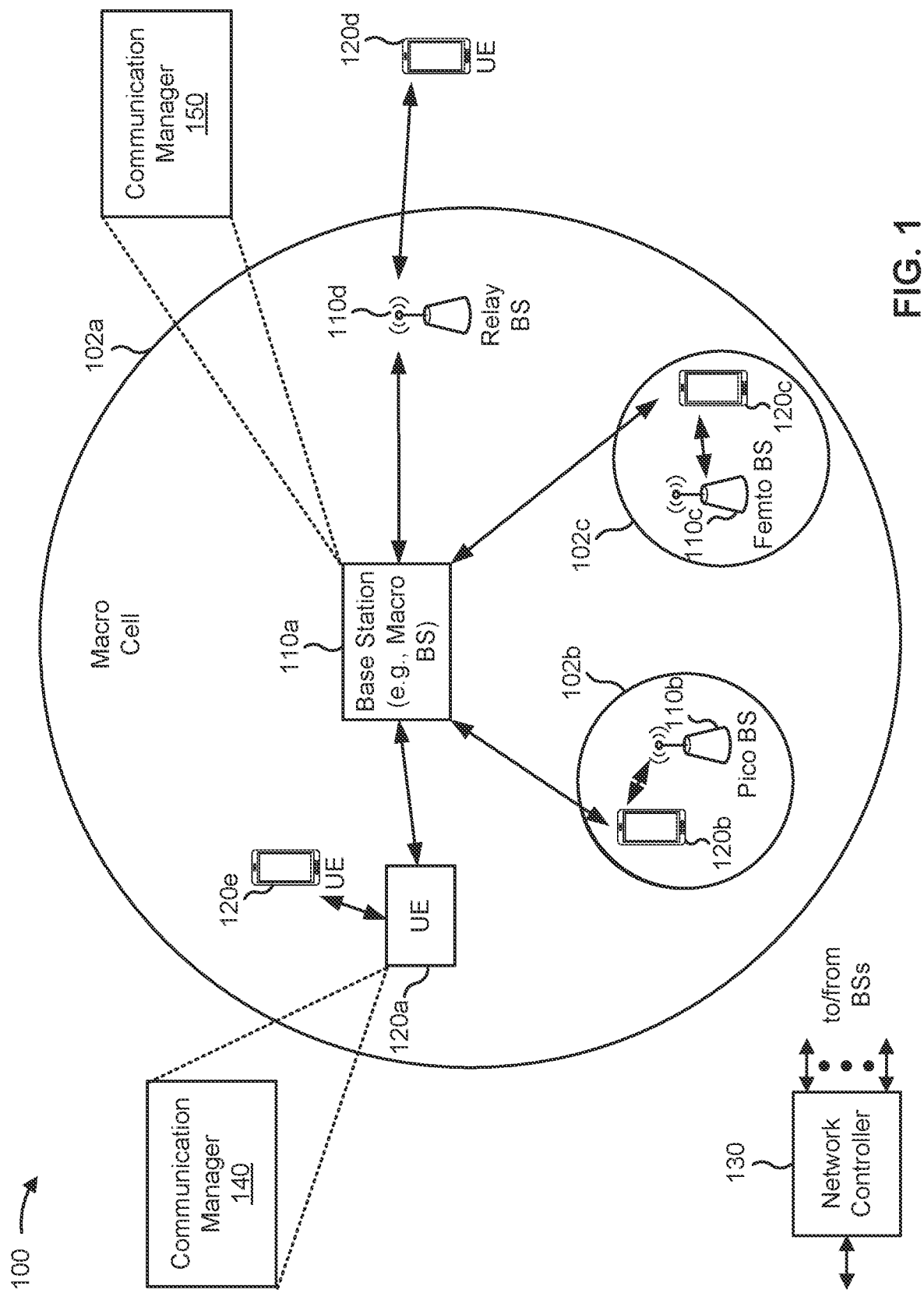
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120a, a UE 120b, a UE 120c, a UE 120d, and a UE 120e). The wireless network 100 may also include one or more network entities, such as network nodes 110 (shown as a network node 110a, a network node 110b, a network node 110c, and a network node 110d), and/or other network entities. A network node 110 is a network entity that communicates with UEs 120. A network node 110 (sometimes referred to as a BS) may include, for example, an NR base station, an LTE base station, a Node B, an eNB (e.g., in 4G), a gNB (e.g., in 5G), an access point, and/or a transmission reception point (TRP). Each network node 110 may provide communication coverage for a particular geographic area. In the Third Generation Partnership Project (3GPP), the term "cell" can refer to a coverage area of a network node 110 and/or a base station subsystem serving this coverage area, depending on the context in which the term is used.

A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro base station. A network node 110 for a pico cell may be referred to as a pico base station. A network node 110 for a femto cell may be referred to as a femto base station or an in-home base station. In the example shown in FIG. 1, the network node 110a may be a macro base station for a macro cell 102a, the network node 110b may be a pico base station for a pico cell 102b, and the network node 110c may be a femto base station for a femto cell 102c. A base station may support one or multiple (e.g., three) cells.

In some examples, a cell may not necessarily be stationary, and the geographic area of the cell may move according to the location of a network node 110 that is mobile (e.g., a mobile base station). In some examples, the network nodes 110 may be interconnected to one another and/or to one or more other network nodes 110 or network entities in the wireless network 100 through various types of backhaul interfaces, such as a direct physical connection or a virtual network, using any suitable transport network.

In some aspects, the term "base station" (e.g., the network node 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the network node 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the network node 110d (e.g., a relay base station) may communicate with the network node 110a (e.g., a macro base station) and the UE 120d in order to facilitate communication between the network node 110a and the UE 120d. A network node 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of network nodes 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities and may provide coordination and control for these network entities. The network controller 130 may communicate with the network nodes 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a first packet and a second packet for transmission during a period for a periodic application. The communication manager 140 may transmit the first packet and the second packet in a combination of a dynamic grant and a configured grant (CG) occasion.

In some aspects, the communication manager 140 may receive downlink control information (DCI) that indicates a dynamic grant and receive a first packet and a second packet for a periodic application in a combination of the dynamic grant and a semi-persistent scheduling (SPS) occasion during a period for the periodic application. Additionally, or alternatively, the communication manager 140 may perform one or more other operations described herein.

As described in more detail elsewhere herein, the communication manager 140 may receive configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication; receive an indication activating or deactivating at least one SPS occasion, of the first SPS configuration or the second SPS configuration; and perform the communication in accordance with the indication. Additionally, or alternatively, the communication manager 140 may perform one or more other operations described herein.

In some aspects, a network entity (e.g., network node 110) may include a communication manager 150. As described in more detail elsewhere herein, the communication manager 150 may receive a first packet and a second packet for transmission during a period for a periodic application. The communication manager 150 may transmit the first packet and the second packet in a combination of a dynamic grant and an SPS occasion. Additionally, or alternatively, the communication manager 150 may perform one or more other operations described herein.

As described in more detail elsewhere herein, the communication manager 150 may transmit configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication; and transmit an indication activating or deactivating at least one SPS occasion, of the first SPS configuration or the second SPS configuration. Additionally, or alternatively, the communication manager 150 may perform one or more other operations described herein.

The communication manager 140 or 150 may communicate, using a set of configured periodic resources, a first set of data packets of a data packet burst associated with a data traffic period; and communicate, using a set of supplementary resources and associated with a state change corresponding to the set of supplementary resources, a second set of data packets of the data packet burst.

As described in more detail elsewhere herein, the communication manager 140 or 150 may provide a configuration associated with a set of supplementary resources; communicate, using a set of configured periodic resources, a first set of data packets of a data burst associated with a data traffic period; and communicate, using the set of supplementary resources and associated with a state change corresponding to the set of supplementary resources, a second set of data packets of the data burst associated with the data traffic period. Additionally, or alternatively, the communication manager 140 or 150 may perform one or more other operations described herein.

As indicated above, FIG. 1 is provided as an example. Other examples may differ from what is described with regard to FIG. 1.

Figure 2:
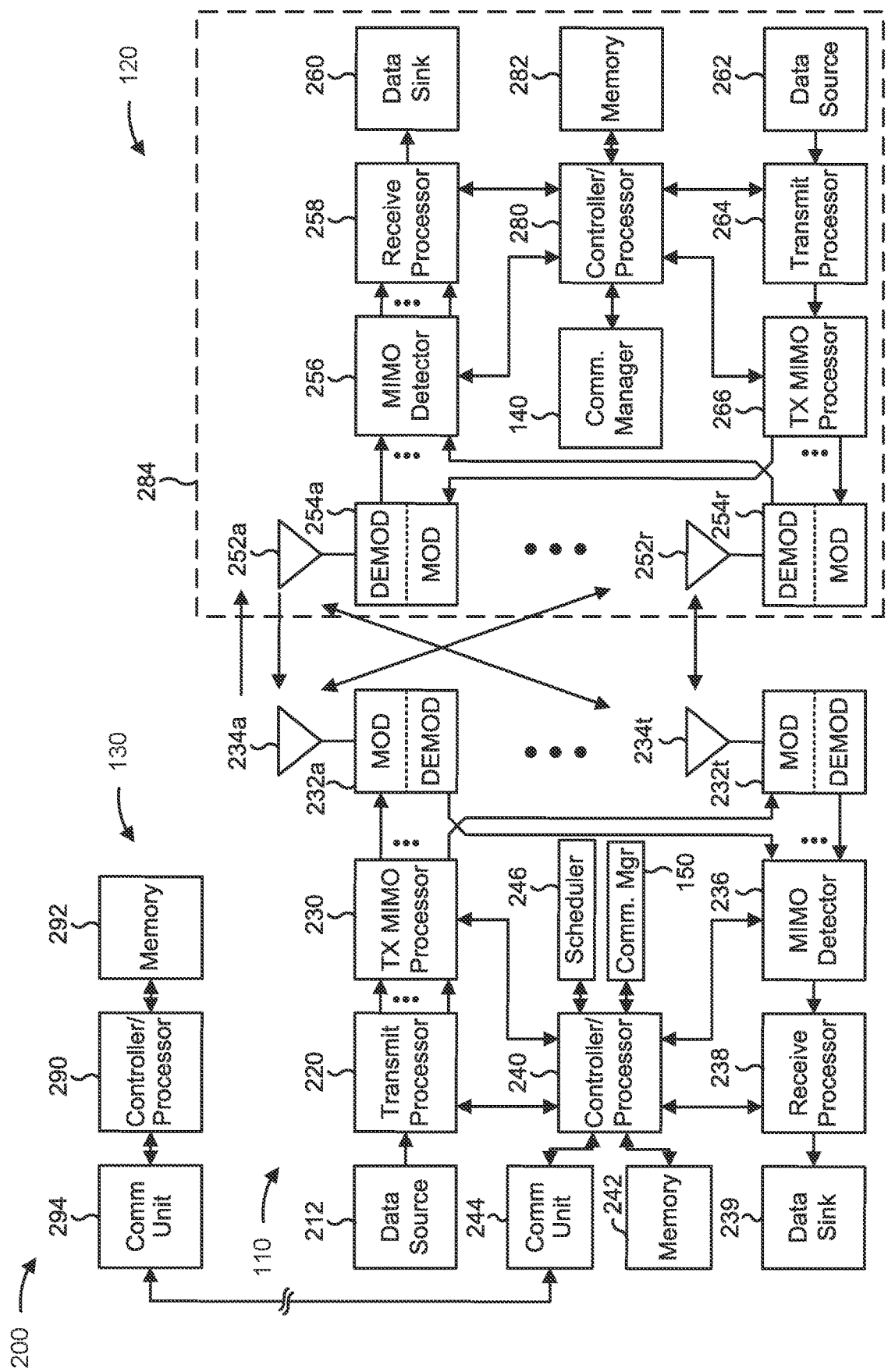
FIG. 2 is a diagram illustrating an example of a network entity (e.g., network node) in communication with a user equipment (UE) in a wireless network, in accordance with the present disclosure.

FIG. 2 is a diagram illustrating an example 200 of a network entity (e.g., network node 110) in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1).

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-23).

At the network entity (e.g., network node 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-23).

A controller/processor of a network entity, (e.g., the controller/processor 240 of the network node 110), the controller/processor 280 of the UE 120, and/or any other component(s) of FIG. 2 may perform one or more techniques associated with using a combination of scheduling resources, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, process 1300 of FIG. 13, process 1700 of FIG. 17, process 1800 of FIG. 18, process 2000 of FIG. 20, process 2100 of FIG. 21, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 1100 of FIG. 11, process 1200 of FIG. 12, process 1300 of FIG. 13, process 1700 of FIG. 17, process 1800 of FIG. 18, process 2000 of FIG. 20, process 2100 of FIG. 21, and/or other processes as described herein. In some examples, executing instructions may include running the instructions, converting the instructions, compiling the instructions, and/or interpreting the instructions, among other examples.

In some aspects, the UE 120 includes means for receiving a first packet and a second packet for transmission during a period for a periodic application; and/or means for transmitting the first packet and the second packet in a combination of a dynamic grant and a CG occasion. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving DCI that indicates a dynamic grant; and/or means for receiving a first packet and a second packet for a periodic application in a combination of the dynamic grant and an SPS occasion during a period for the periodic application.

In some aspects, a network entity (e.g., network node 110) includes means for receiving a first packet and a second packet for transmission during a period for a periodic application; and/or means for transmitting the first packet and the second packet in a combination of a dynamic grant and an SPS occasion. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for receiving configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication; means for receiving an indication activating or deactivating at least one SPS occasion, of the first SPS configuration or the second SPS configuration; and/or means for performing the communication in accordance with the indication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication; and/or means for transmitting an indication activating or deactivating at least one SPS occasion, of the first SPS configuration or the second SPS configuration. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an apparatus of a base station includes means for communicating, using a set of configured periodic resources, a first set of data packets of a data packet burst associated with a data traffic period; or means for communicating, using a set of supplementary resources and associated with a state change corresponding to the set of supplementary resources, a second set of data packets of the data packet burst.

In some aspects, the apparatus of the base station includes means for providing a configuration associated with a set of supplementary resources; means for communicating, using a set of configured periodic resources, a first set of data packets of a data burst associated with a data traffic period; or means for communicating, using the set of supplementary resources and associated with a state change corresponding to the set of supplementary resources, a second set of data packets of the data burst associated with the data traffic period. In some aspects, the means for the apparatus of the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the apparatus of the base station to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
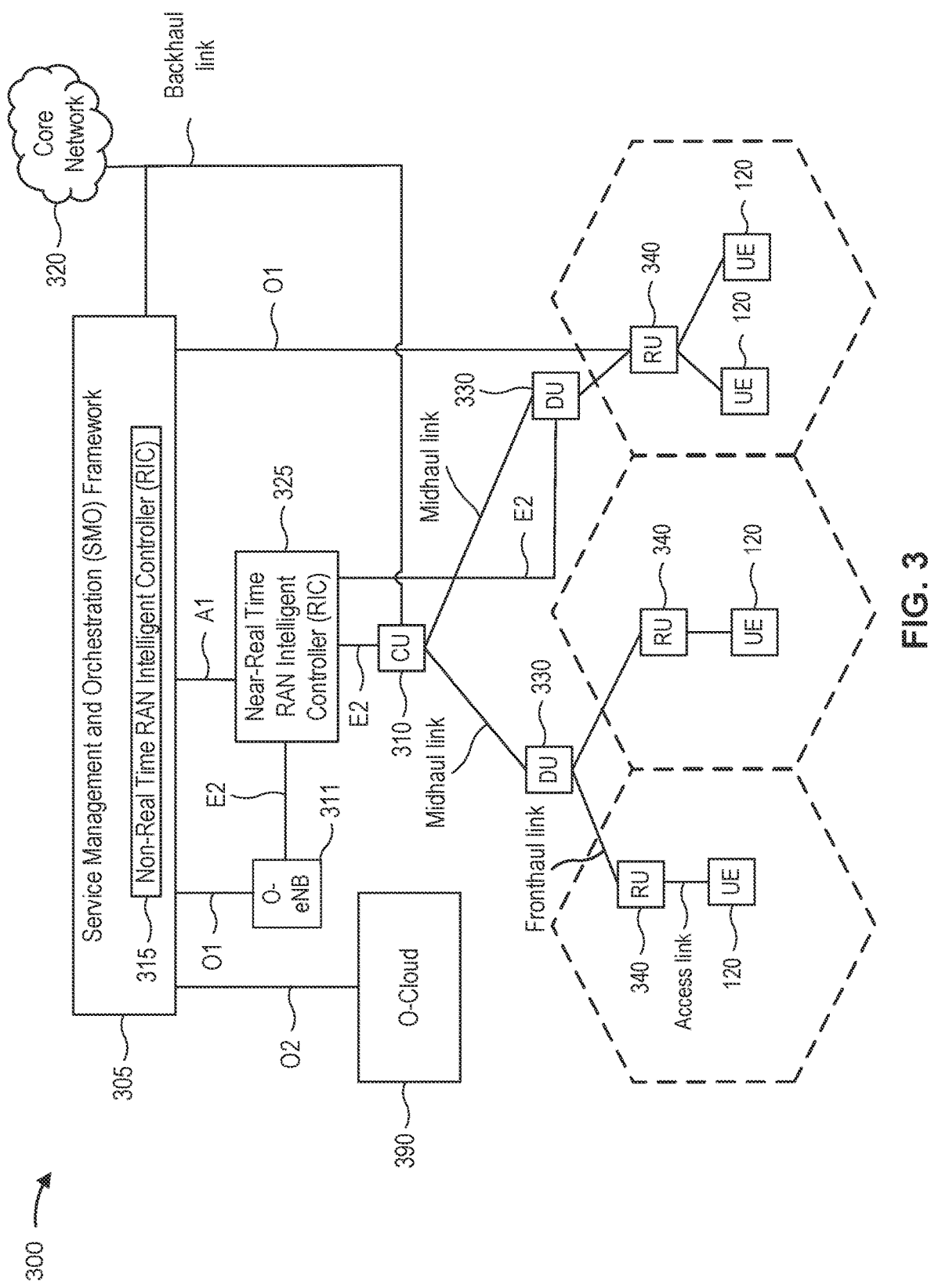
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
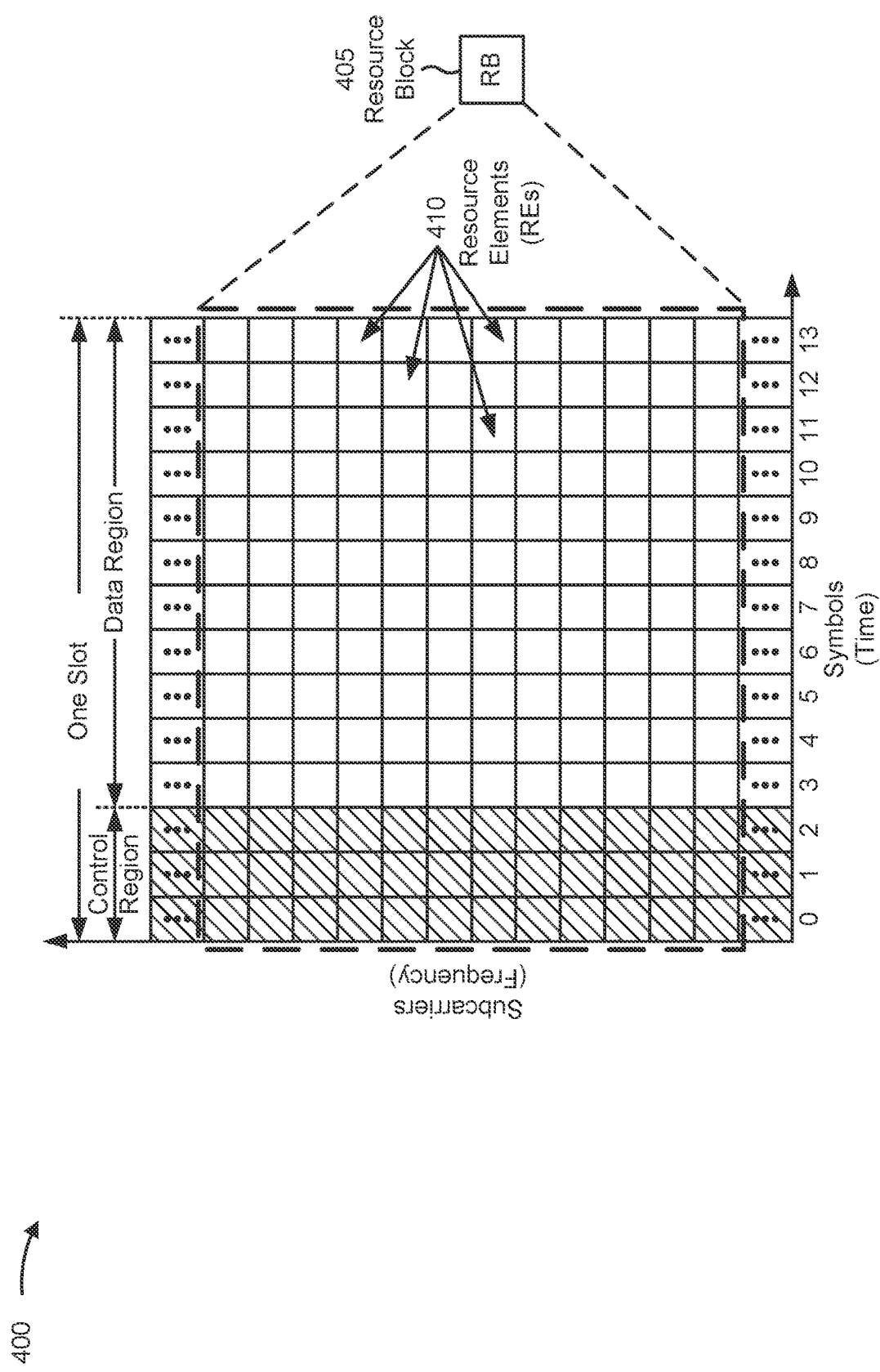
FIG. 4 is a diagram illustrating an example of a slot format, in accordance with the present disclosure.

FIG. 4 is a diagram illustrating an example 400 of a slot format, in accordance with the present disclosure. As shown in FIG. 4, time-frequency resources in a radio access network may be partitioned into resource blocks, shown by a single resource block (RB) 405. An RB 405 is sometimes referred to as a physical resource block (PRB). An RB 405 includes a set of subcarriers (e.g., 12 subcarriers) and a set of symbols (e.g., 14 symbols) that are schedulable by a network entity (e.g., network node 110) as a unit. In some aspects, an RB 405 may include a set of subcarriers in a single slot. As shown, a single time-frequency resource included in an RB 405 may be referred to as a resource element (RE) 410. An RE 410 may include a single subcarrier (e.g., in frequency) and a single symbol (e.g., in time). A symbol may be referred to as an orthogonal frequency division multiplexing (OFDM) symbol. An RE 410 may be used to transmit one modulated symbol, which may be a real value or a complex value.

In some telecommunication systems (e.g., NR), RBs 405 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

In some symbols, such as in the control region, a network entity may transmit downlink control information (DCI) in a physical downlink control channel (PDCCH). A UE may transmit uplink control information (UCI) in a physical uplink control channel (PUCCH). The network entity may transmit data in a physical downlink shared channel (PDSCH). The UE may transmit data in a physical uplink shared channel (PUSCH).

As indicated above, FIG. 4 is provided as an example. Other examples may differ from what is described with respect to FIG. 4.

Figure 5:
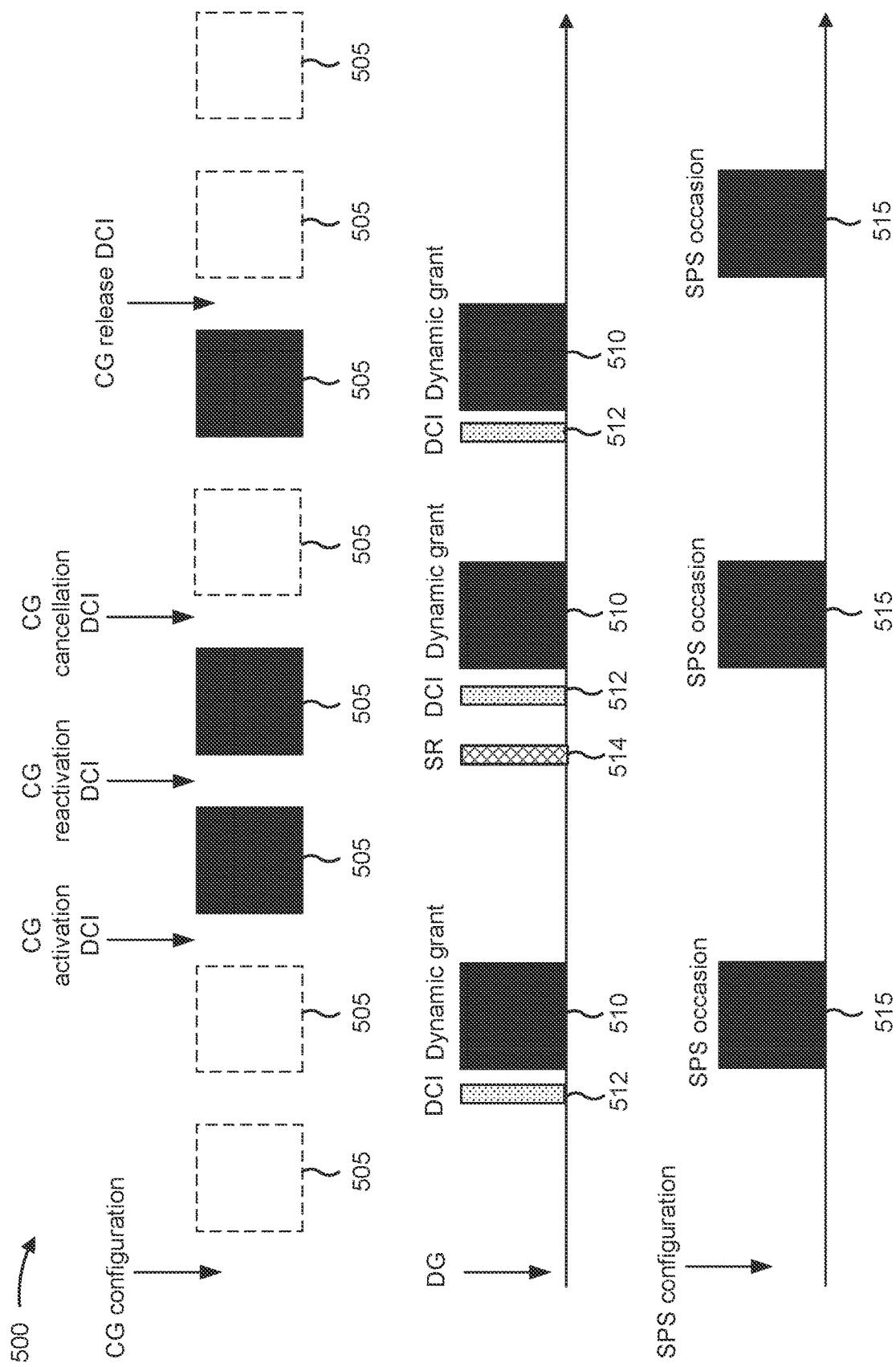
FIG. 5 is a diagram illustrating an example of uplink configured grant communication, in accordance with the present disclosure.

FIG. 5 is a diagram illustrating an example 500 of uplink CG communication, in accordance with the present disclosure.

PRBs for uplink communications may be granted according to a configuration. For example, CG communications may include periodic uplink communications that are configured for a UE, such that the network entity does not need to send separate DCI to schedule each uplink communication, thereby conserving signaling overhead.

As shown in example 500, a UE (e.g., a UE 120) may be configured with a CG configuration for CG communications. For example, the UE may receive the CG configuration via an RRC message transmitted by a network entity (e.g., a network node 110). The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 505 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

There are two types of CG for PUSCH communications. For Type 1 CG PUSCH, RRC signaling configures the time and frequency domain resource allocation, including a periodicity, an offset, a start symbol, a length of the PUSCH communication, the MCS, the number of repetitions, a redundancy version (RV), and a transmit power level, among other parameters.

For Type 2 CG PUSCH, only periodicity and the number of repetitions are configured by RRC signaling. Other parameters, such as the MCS, an RB allocation, and/or antenna ports, for the CG PUSCH communications are configured through an activation DCI. The UE may begin transmitting in the CG occasions 505 based at least in part on receiving the CG activation DCI. For example, beginning with a next scheduled CG occasion 505 subsequent to receiving the CG activation DCI, the UE may transmit a PUSCH communication in the scheduled CG occasions 505 using the communication parameters indicated in the CG activation DCI. The UE may refrain from transmitting in configured CG occasions 505 prior to receiving the CG activation DCI.

The network entity may transmit CG reactivation DCI to the UE to change the communication parameters for the CG PUSCH communications. Based at least in part on receiving the CG reactivation DCI, and the UE may begin transmitting in the scheduled CG occasions 505 using the communication parameters indicated in the CG reactivation DCI. For example, beginning with a next scheduled CG occasion 505 subsequent to receiving the CG reactivation DCI, the UE may transmit PUSCH communications in the scheduled CG occasions 505 based at least in part on the communication parameters indicated in the CG reactivation DCI.

In some cases, such as when the network entity needs to override a scheduled CG communication for a higher priority communication, the network entity may transmit CG cancellation DCI to the UE to temporarily cancel or deactivate one or more subsequent CG occasions 505 for the UE. The CG cancellation DCI may deactivate only a subsequent one CG occasion 505 or a subsequent N CG occasions 505 (where N is an integer). CG occasions 505 after the one or more (e.g., N) CG occasions 505 subsequent to the CG cancellation DCI may remain activated. Based at least in part on receiving the CG cancellation DCI, the UE may refrain from transmitting in the one or more (e.g., N) CG occasions 505 subsequent to receiving the CG cancellation DCI. As shown in example 500, the CG cancellation DCI cancels one subsequent CG occasion 505 for the UE. After the CG occasion 505 (or N CG occasions) subsequent to receiving the CG cancellation DCI, the UE may automatically resume transmission in the scheduled CG occasions 505.

The network entity may transmit CG release DCI to the UE to deactivate the CG configuration for the UE. The UE may stop transmitting in the scheduled CG occasions 505 based at least in part on receiving the CG release DCI. For example, the UE may refrain from transmitting in any scheduled CG occasions 505 until another CG activation DCI is received from the network entity. Whereas the CG cancellation DCI may deactivate only a subsequent one CG occasion 505 or a subsequent N CG occasions 505, the CG release DCI deactivates all subsequent CG occasions 505 for a given CG configuration for the UE until the given CG configuration is activated again by a new CG activation DCI.

Example 500 also shows that a network entity (e.g., network node 110) may provide dynamic grants (DGs) 510 for uplink communications. The network entity may transmit a PDCCH communication, such as an uplink grant DCI 512. The DCI 512 specifies a scheduled resource (time-frequency resources) and transmission parameters for the UE to use to transmit a communication on the PUSCH. A dynamic grant 510 may be in response to a scheduling request (SR) 514 or a buffer status report (BSR) from a UE. The UE may transmit an SR 514 on a PUCCH, requesting radio resources in the uplink when the UE has pending data in its buffer.

Example 500 further shows that the network entity may transmit communications using a scheduling instance of SPS, or an SPS occasion 515. SPS occasions 515 are periodic resources allocated for the downlink first transmission of transport blocks (TB s) to the UE, and retransmissions are sent via dynamic grants. SPS occasions 515 are transmitted to the UE without accompanying PDCCH communications (e.g., DCI) and thus the UE does not have to perform PDCCH detection, processing, and decoding. For a given SPS occasion 515, the periodicity and configured parameters (e.g., number of RBs, an MCS, PUCCH resources for hybrid automatic repeat request (HARQ) acknowledgement (ACK) feedback) are the same for all SPS occasions 515 in each SPS configuration. The network entity may transmit an SPS configuration to the UE such that the UE is monitoring for communications during each SPS occasion 515. SPS may be configured by RRC signaling or activated using layer 1 (L1) signaling.

As indicated above, FIG. 5 is provided as an example. Other examples may differ from what is described with respect to FIG. 5.

Figure 6:
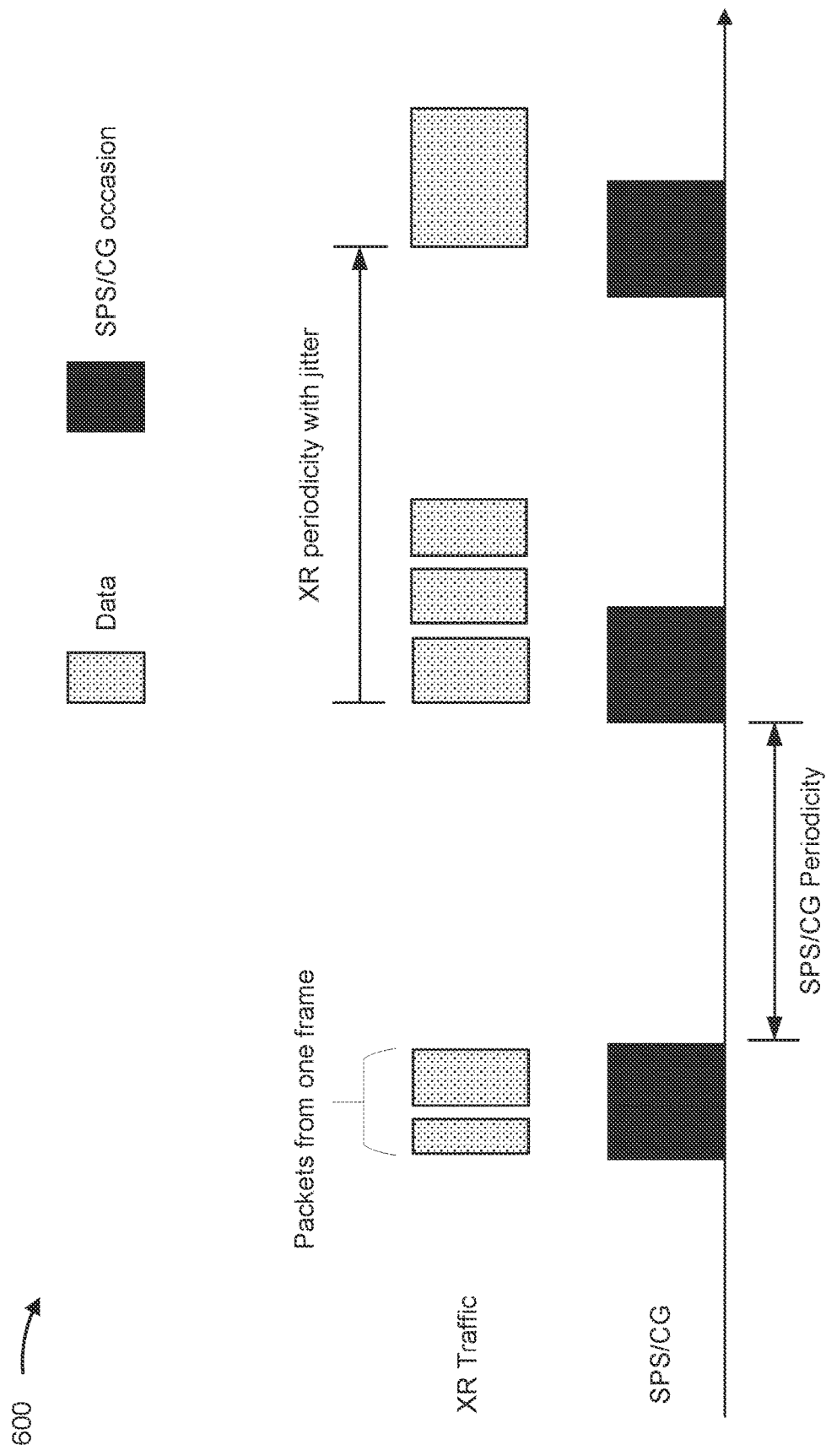
FIG. 6 is a diagram illustrating an example of extended reality (XR) traffic, in accordance with the present disclosure.

FIG. 6 is a diagram illustrating an example 600 of extended reality (XR) traffic, in accordance with the present disclosure.

SPS and CG are used to eliminate control resource overhead so that those resources can be allocated to data transmissions. Also, CG can reduce latency for uplink transmission. Therefore, SPS and CG may be candidates for improving XR applications, which is sensitive to network latency. As shown by example 600, XR traffic may vary in the number of packets per burst and the packet size for each packet. The XR periodicity may not match the SPS or the CG periodicity, and the arrival times of XR traffic may vary due to jitter. Multiple flows of XR traffic may also vary between statistics.

As indicated above, FIG. 6 is provided as an example. Other examples may differ from what is described with regard to FIG. 6.

Figure 7:
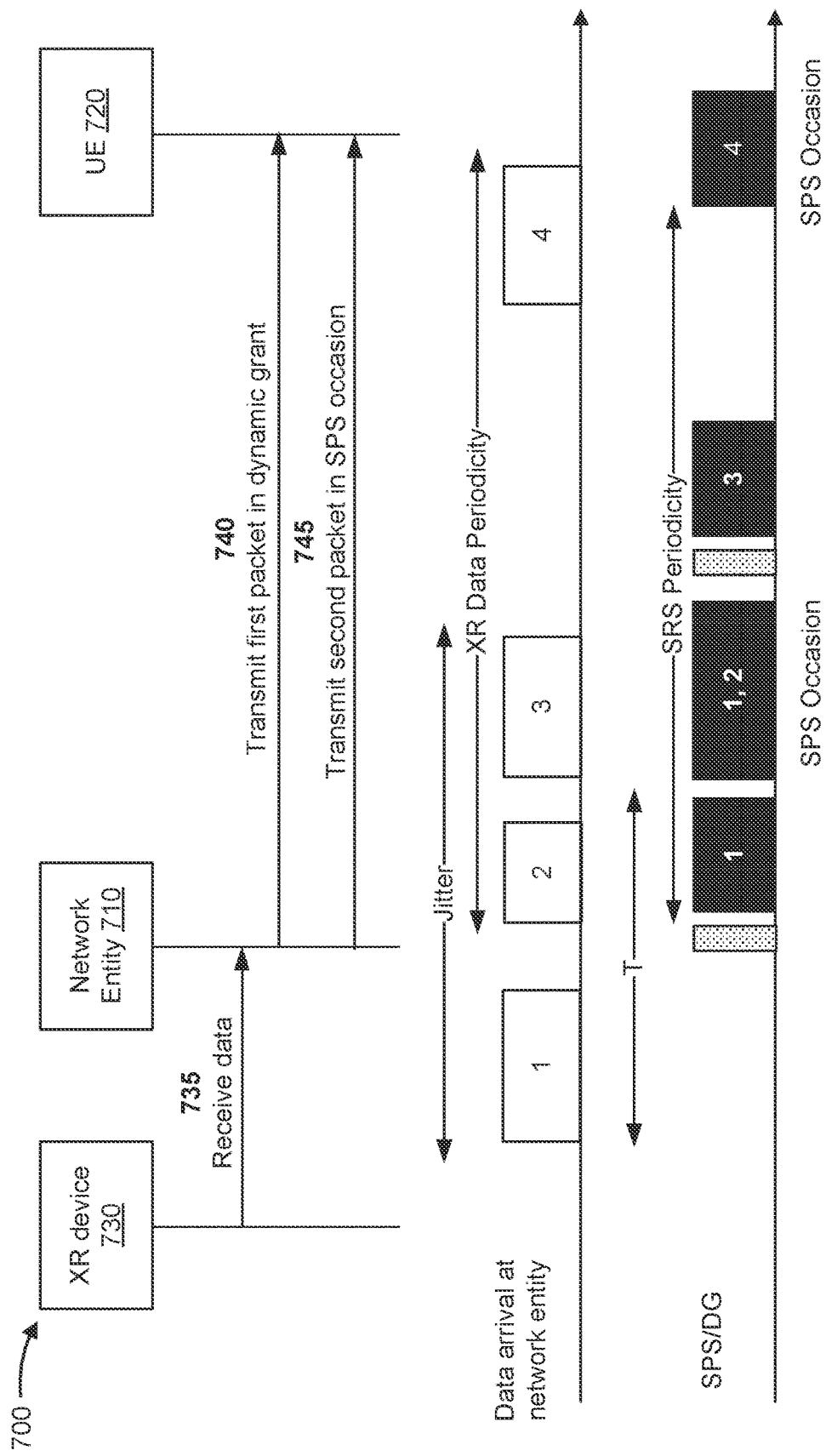
FIG. 7 is a diagram illustrating an example of using a combination of scheduling resources, in accordance with the present disclosure.

FIG. 7 is a diagram illustrating an example 700 of using a combination of scheduling resources, in accordance with the present disclosure. As shown in FIG. 7, a network entity 710 (e.g., a network node 110, a component of a disaggregated base station) and a UE 720 (e.g., a UE 120) may communicate with one another. An XR device 730 may communicate with the network entity 710 or the UE 720.

According to various aspects described herein, the network entity 710 may use a combination of dynamic grants and SPS to transmit XR data to UE 720. The combination of dynamic grants and SPS may address the variability in the packet size, the number of packets, and the arrival time of packets per burst of XR traffic. In some aspects, the UE 720 may use a combination of dynamic grant and CG to transmit XR data. A combination may include consecutive packets or portions of the consecutive packets that are transmitted with different scheduling resources, whether a dynamic grant and an SPS occasion or a dynamic grant and a CG occasion.

As shown by reference number 735, the network entity 710 may receive data from the XR device 730. The data may include a first packet and a second packet as part of XR data (including control information) for a periodic application, such as an XR application. The first packet and the second packet may represent multiple packets that may be received during a period of the periodic application. The period may be a time duration that includes multiple packets. For example, the period may be a time interval associated with a traffic burst. The period may repeat according to a periodicity. The network entity 710 may transmit the first packet and the second packet in a combination of a dynamic grant and an SPS occasion. For example, as shown by reference number 740 and reference number 745, the network entity 710 may transmit the first packet in a dynamic grant and a second packet in an SPS occasion. The network entity 710 may transmit DCI indicating the dynamic grant. Alternatively, the network entity 710 may transmit the first packet in the SPS occasion and the second packet in the dynamic grant. In some aspects, portions of the first packet may be transmitted in both the SPS occasion and the dynamic grant. At least a portion of the second packet may also be transmitted in the SPS occasion, the dynamic grant, or both the SPS occasion and the dynamic grant.

The network entity 710 may transmit the first packet in the dynamic grant or the SPS occasion based at least in part on a time duration between the arrival of the first packet for transmission (e.g., start of the first packet, end of the first packet) and the SPS occasion. If the time duration for the first packet satisfies (e.g., is greater than, equal to or greater than) a time duration threshold T (e.g., maximum duration), the network entity 710 may select the dynamic grant for the first packet. The time duration threshold T may be selected so as to not exceed the packet delay budget (PDB) for the first packet and expire. If the time duration for the first packet does not satisfy (e.g., is less than, is less than or equal to) the time duration threshold T, the network entity 710 may transmit the first packet in the SPS occasion.

In some aspects, if the first packet satisfies (e.g., is greater than, is equal or greater than) a size threshold, the network entity 710 may transmit the first packet in both the dynamic grant and the SPS occasion (e.g., the SPS occasion with packet 1 and packet 2 in example 700). If the first packet does not satisfy (e.g., is less than, is less than or equal to) the size threshold (e.g., maximum size), the network entity 710 may transmit the first packet in only the dynamic grant or only the SPS occasion. By using a combination of scheduling resources, the network entity 710 and the UE 720 uses signaling resources more efficiently and reduces latency.

As indicated above, FIG. 7 is provided as an example. Other examples may differ from what is described with regard to FIG. 7.

Figure 8:
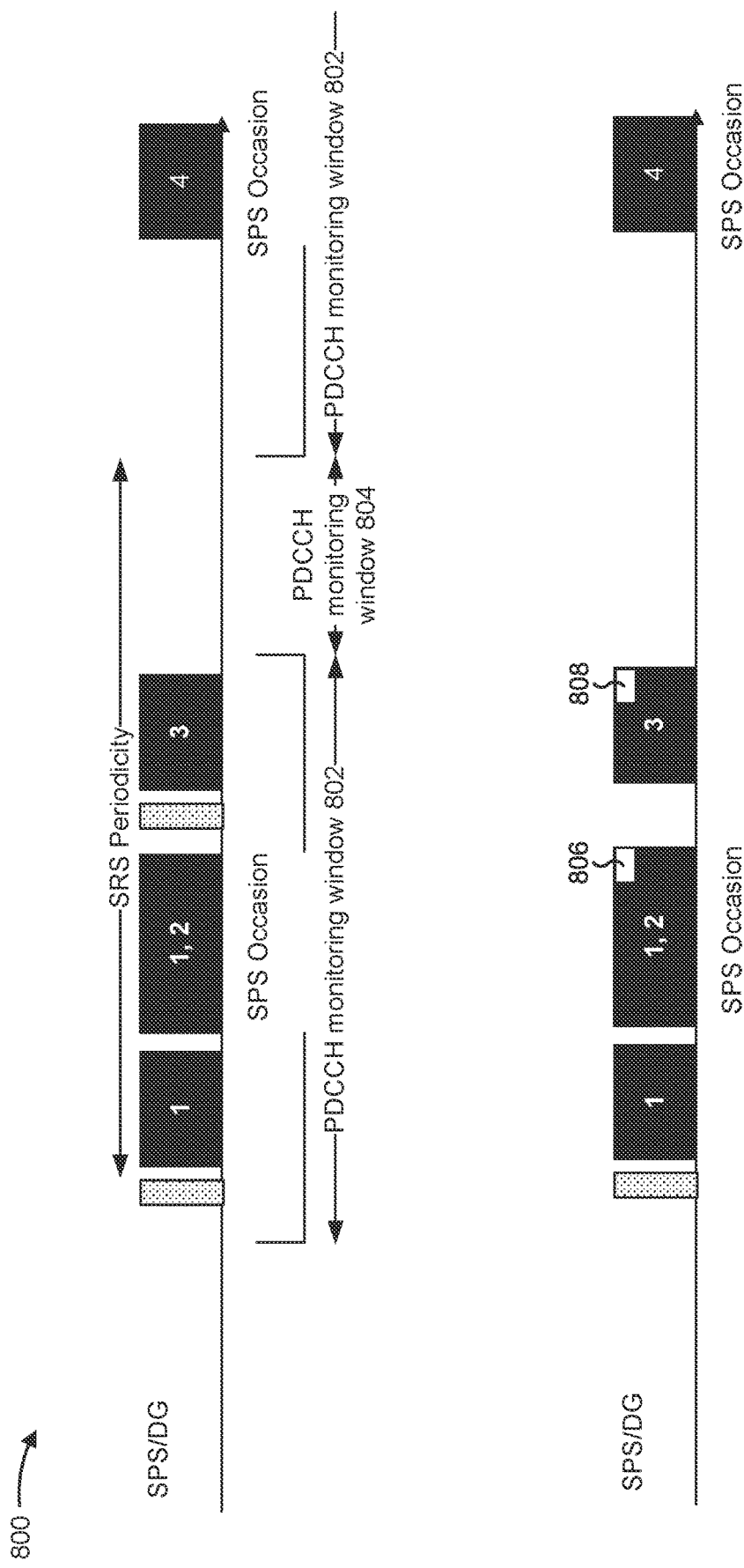
FIG. 8 is a diagram illustrating an example of using a combination of scheduling resources, in accordance with the present disclosure.

FIG. 8 is a diagram illustrating an example 800 of using a combination of scheduling resources, in accordance with the present disclosure.

In some aspects, as shown by example 800, the UE 720 may use a time window 802 for monitoring for PDCCH communications (e.g., DCI). The UE 720 may monitor for PDCCH communications during the time window 802 outside of an SPS occasion when the UE 720 is not receiving the SPS occasion. The UE 720 may adjust a periodicity of monitoring occasions during the time window 802. For example, the UE 720 may decrease the PDCCH monitoring periodicity during the time window 802, when the UE 720 is not receiving the SPS occasion. This may include decreasing the gaps between monitoring occasions in the time window 802 when the probability of receiving data is high. The UE 720 may increase the PDCCH monitoring periodicity outside the time window 802, such as during time window 804 when the probability of receiving data is lower. The network entity 710 or the UE 720 may set the PDCCH monitoring periodicity to a specified duration based at least in part on a tradeoff between reducing latency and reducing power consumption.

In some aspects, the network entity 710 may transmit an indication 806 to skip a PDCCH communication for a dynamic grant. The indication 806 may be based on a waveform sequence (e.g., DMRS pattern), in DCI, or in a MAC CE. The dynamic grant may be, for example, for more XR data in a PDSCH communication. The network entity 710 may transmit the indication 806 in an SPS occasion (e.g., in a PDSCH communication). The PDCCH communication may then be removed. The network entity 710 may also transmit an indication of the dynamic grant for the PDSCH communication. In some aspects, if a dynamic grant is before an SPS occasion, and the SPS occasion would then be skipped (e.g., due to a lack of a packet being received for transmission during the SPS occasion), the network entity 710 may transmit an indication 808 to skip monitoring during the SPS occasion. The network entity 710 may also indicate an end of an XR traffic burst. The indications help reduce power consumption.

In some aspects, the network entity 710 may transmit an indication of a change in the MCS and/or a change in the length of a PDSCH communication of the SPS occasion (e.g., set in preceding PDSCH communication). The indication or other signaling described herein may be sequence-based, DMRS-based, or MAC CE-based.

As indicated above, FIG. 8 is provided as an example. Other examples may differ from what is described with regard to FIG. 8.

Figure 9:
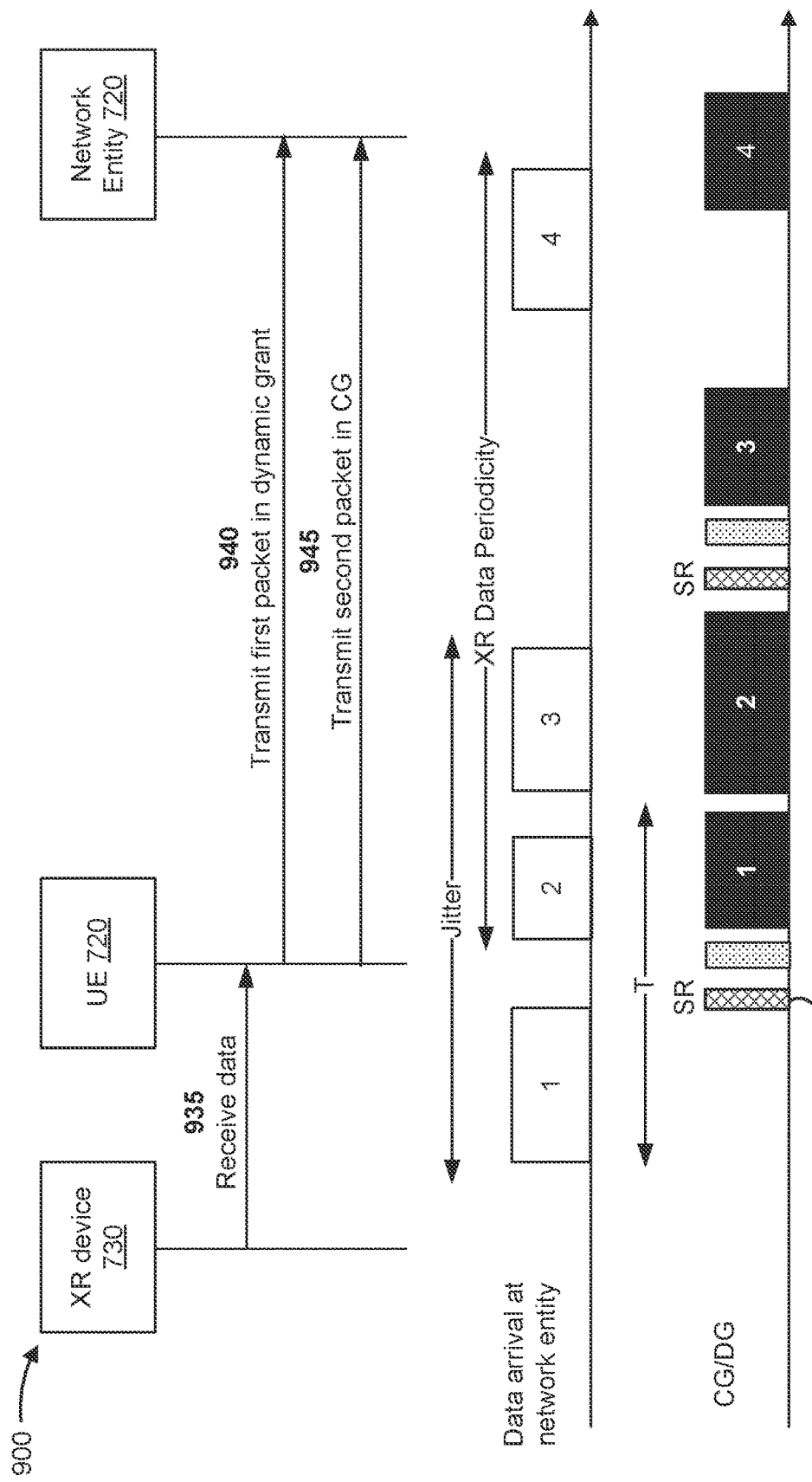
FIG. 9 is a diagram illustrating an example of using a combination of scheduling resources, in accordance with the present disclosure.

FIG. 9 is a diagram illustrating an example 900 of using a combination of scheduling resources, in accordance with the present disclosure.

In some aspects, the UE 720 may use a combination of dynamic grants and CG occasions to transmit XR data. As shown by reference number 935, the UE 720 may receive data from the XR device 730. The data may include a first packet and a second packet. The UE 720 may transmit the first packet and the second packet in a combination of a dynamic grant and a CG occasion. For example, as shown by reference number 940 and reference number 945, the UE 720 may transmit the first packet in a dynamic grant and a second packet in a CG occasion. This may involve transmitting an SR 942 to request the dynamic grant and then receiving DCI indicating the dynamic grant. Alternatively, the UE 720 may transmit the first packet in the CG occasion and the second packet in the dynamic grant.

The UE 720 may transmit the first packet in the dynamic grant or the CG occasion based at least in part on a time duration between the arrival of the first packet for transmission (e.g., start of the first packet, end of the first packet) and the CG occasion. If the time duration for the first packet satisfies (e.g., is greater than, equal to or greater than) a time duration threshold T (e.g., maximum duration), the UE 720 may select the dynamic grant for the first packet. If the time duration for the first packet does not satisfy (e.g., is less than, is less than or equal to) the time duration threshold T, the UE 720 may transmit the first packet in the CG occasion.

In some aspects, if the first packet satisfies (e.g., is greater than, is equal or greater than) a size threshold, the UE 720 may transmit the first packet in both the dynamic grant and the CG occasion (e.g., the CG occasion with packet 1 and packet 2 in example 900). If the first packet does not satisfy (e.g., is less than, is less than or equal to) the size threshold (e.g., maximum size), the UE 720 may transmit the first packet in only the dynamic grant or in only the CG occasion. By using a combination of scheduling resources, the network entity 710 and the UE 720 uses signaling resources more efficiently and reduces latency.

In some aspects, the UE 720 may receive a waveform sequence (e.g., DMRS pattern), DCI, or a MAC CE that indicates a next dynamic grant. The UE 720 may skip transmitting a scheduling request and monitoring for DCI for the next dynamic grant. The UE 720 may receive a packet in the next dynamic grant. In some aspects, the UE 720 may receive a waveform sequence, DCI, or a MAC CE that indicates that a next CG occasion is to be skipped. The UE 720 may skip monitoring in the next CG occasion. In some aspects, the UE 720 may receive a waveform sequence, DCI, or a MAC CE that modifies parameters for the CG, activates dynamic grant resources, or assists with dynamic grant requests.

As indicated above, FIG. 9 is provided as an example. Other examples may differ from what is described with regard to FIG. 9.

Figure 10:
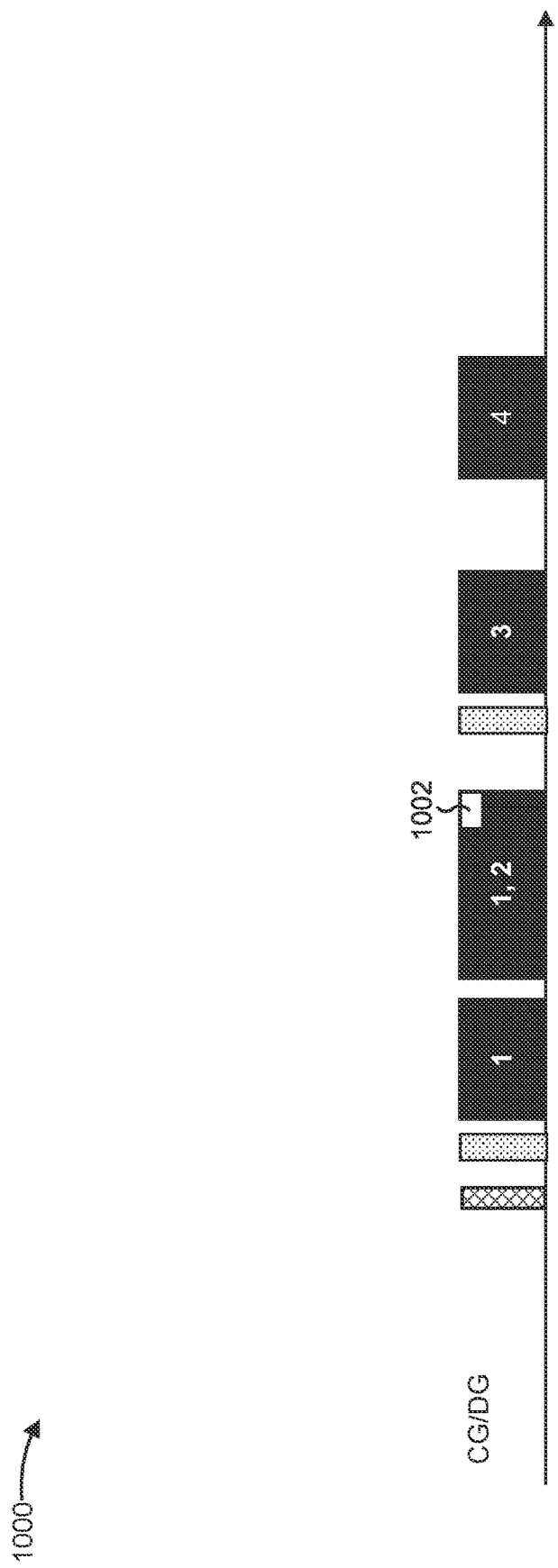
FIG. 10 is a diagram illustrating an example of using a combination of scheduling resources, in accordance with the present disclosure.

FIG. 10 is a diagram illustrating an example 1000 of using a combination of scheduling resources, in accordance with the present disclosure.

In some aspects, the UE 720 may transmit an indication 1002 in a CG occasion, or in other signaling or data, that indicates that there is more data. The UE 720 may skip transmitting an SR before transmitting a packet on a next dynamic grant. In some aspects, the UE 720 may transmit an indication to skip both the SR and the DCI for the next dynamic grant. The sequences of a DMRS pattern could be used to indicate a different resource allocation.

In some aspects, the UE 720 may receive an indication of a change in the MCS and/or a change in the length of a PDSCH communication of the SPS occasion (e.g., set in preceding PDSCH communication). The signaling may be sequence-based, DMRS-based, or MAC CE-based. The UE 720 may transmit PDSCH communications based at least in part on the change.

In some aspects, the PUSCH-based indicator may allow for more of a payload but the MAC CE could incur significant delay. The indicator may be PUCCH-based if there is UCI to transmit before the resource is needed.

As indicated above, FIG. 10 is provided as an example. Other examples may differ from what is described with regard to FIG. 10.

Figure 11:
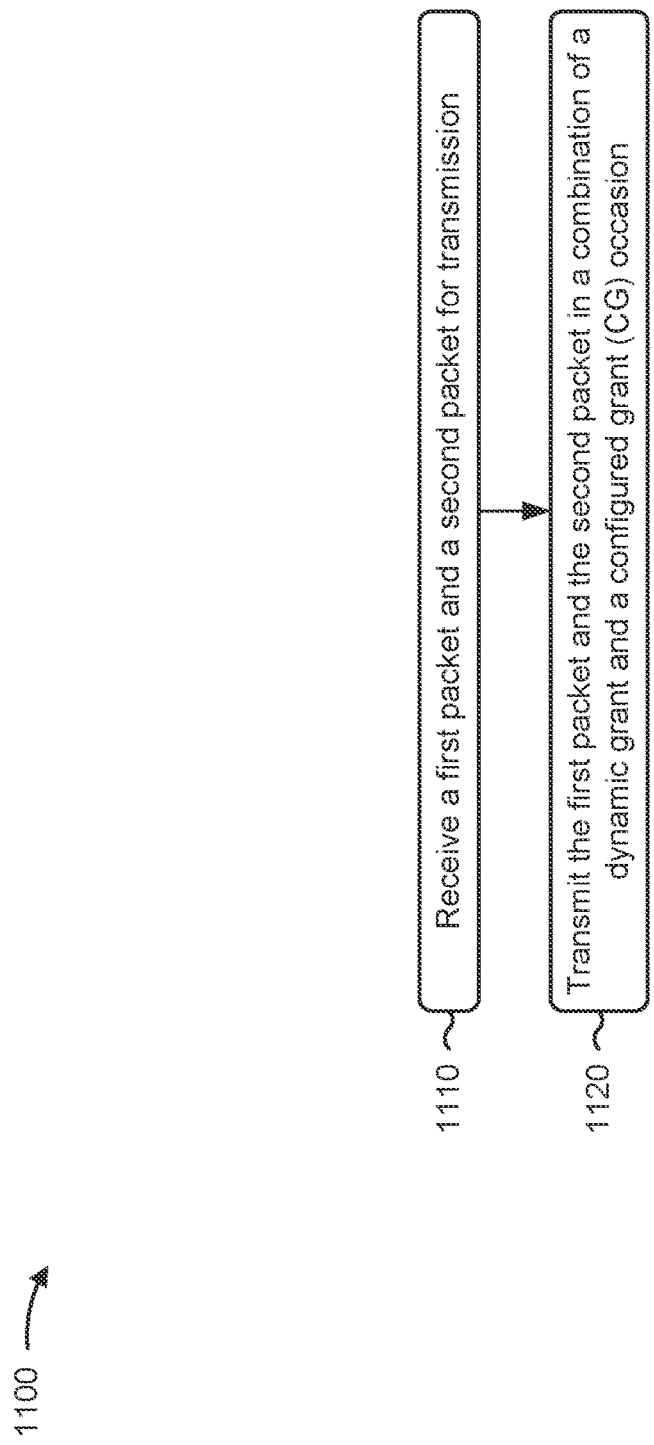
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., a UE 120, UE 720) performs operations associated with using a combination of scheduling resources.

As shown in FIG. 11, in some aspects, process 1100 may include receiving a first packet and a second packet for transmission during a period for a periodic application (block 1110). For example, the UE (e.g., using communication manager 2208 and/or reception component 2202 depicted in FIG. 14) may receive a first packet and a second packet for transmission during a period for a periodic application, as described above, for example, in connection with reference number 735 of FIG. 7 or reference number 935 of FIG. 9. The periodic application may be an XR application, and the first packet and the second packet may be part of XR data.

As further shown in FIG. 11, in some aspects, process 1100 may include transmitting the first packet and the second packet in a combination of a dynamic grant and a CG occasion (block 1120). For example, the UE (e.g., using communication manager 2208 and/or transmission component 2204 depicted in FIG. 14) may transmit the first packet and the second packet in a combination of a dynamic grant and a CG occasion, as described above, for example, in connection with reference numbers 740 and 745 of FIG. 7 or reference numbers 940 and 945 of FIG. 9, as well as in connection with FIGS. 8 and 10.

Process 1100 may include additional aspects, such as any single aspect or any combination of aspects described below and/or in connection with one or more other processes described elsewhere herein.

In a first aspect, the transmitting includes transmitting a request for the dynamic grant for the first packet, receiving DCI indicating the dynamic grant, transmitting the first packet in the dynamic grant, and transmitting the second packet in the CG occasion.

In a second aspect, alone or in combination with the first aspect, the transmitting includes transmitting the first packet in the CG occasion, transmitting a request for the dynamic grant for the second packet, receiving DCI indicating the dynamic grant, and transmitting the second packet in the dynamic grant.

In a third aspect, alone or in combination with one or more of the first and second aspects, process 1100 includes selecting the dynamic grant or the CG occasion for the first packet based at least in part on a time duration between arrival of the first packet and the CG occasion.

In a fourth aspect, alone or in combination with one or more of the first through third aspects, the selecting includes selecting the dynamic grant for the first packet in response to the time duration satisfying a time duration threshold, and selecting the CG occasion for the first packet in response to the time duration not satisfying the time duration threshold.

In a fifth aspect, alone or in combination with one or more of the first through fourth aspects, the time duration threshold is less than or equal to a packet delay budget for the first packet.

In a sixth aspect, alone or in combination with one or more of the first through fifth aspects, the transmitting includes transmitting the first packet in both the dynamic grant and the CG occasion based at least in part on a size of the first packet satisfying a size threshold.

In a seventh aspect, alone or in combination with one or more of the first through sixth aspects, the transmitting includes transmitting the second packet with the first packet in the dynamic grant or the CG occasion.

In an eighth aspect, alone or in combination with one or more of the first through seventh aspects, process 1100 includes transmitting a waveform sequence, DCI, or a MAC CE that indicates a next dynamic grant, skipping transmitting a scheduling request and monitoring for DCI for the next dynamic grant, and receiving a packet in the next dynamic grant.

In a ninth aspect, alone or in combination with one or more of the first through eighth aspects, process 1100 includes transmitting a waveform sequence, DCI, or a MAC CE that indicates that a next CG occasion or a group of upcoming CG occasions are to be skipped, and skipping monitoring in the next CG occasion or the group of upcoming CG occasions.

In a tenth aspect, alone or in combination with one or more of the first through ninth aspects, the CG occasion includes an indication that one or more packets are to be transmitted in one or more preconfigured dynamic grants, and process 1100 includes transmitting the one or more packets in the one or more preconfigured dynamic grants without transmitting a scheduling request for the one or more preconfigured dynamic grants.

In an eleventh aspect, alone or in combination with one or more of the first through tenth aspects, the first packet and the second packet include XR traffic, and the periodic application is an XR application.

In a twelfth aspect, alone or in combination with one or more of the first through eleventh aspects, process 1100 includes transmitting a waveform sequence, DCI, or a medium access control control element (MAC CE) that indicates a change in the configured parameters for the next CG occasion.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
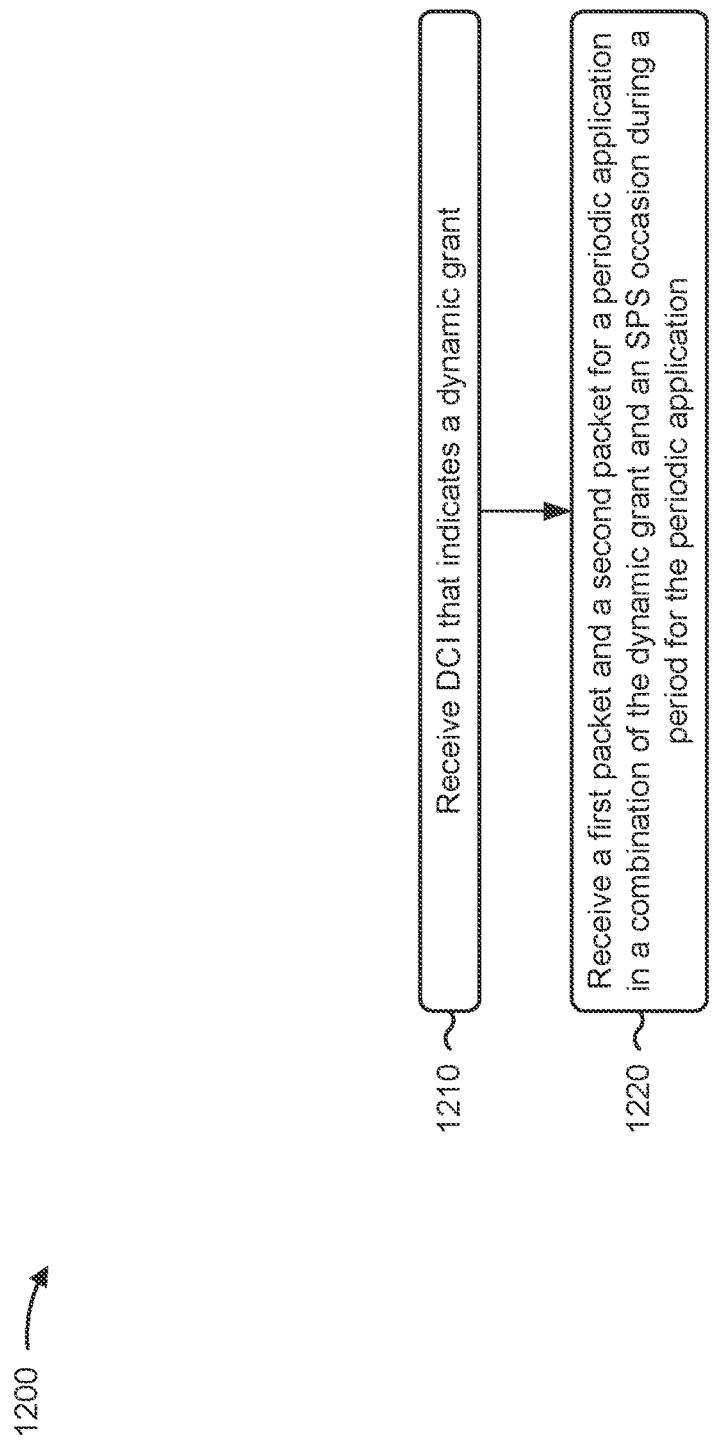
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120, UE 720) performs operations associated with using a combination of scheduling resources.

As shown in FIG. 12, in some aspects, process 1200 may include receiving DCI that indicates a dynamic grant (block 1210). For example, the UE (e.g., using communication manager 2208 and/or reception component 2202 depicted in FIG. 14) may receive DCI that indicates a dynamic grant, as described above, for example, in connection with FIGS. 7-10.

As further shown in FIG. 12, in some aspects, process 1200 may include receiving a first packet and a second packet for a periodic application in a combination of the dynamic grant and an SPS occasion during a period for the periodic application (block 1220). For example, the UE (e.g., using communication manager 2208 and/or reception component 2202 depicted in FIG. 14) may receive a first packet and a second packet for a periodic application in a combination of the dynamic grant and an SPS occasion during a period for the periodic application, as described above, for example, in connection with reference numbers 740 and 745 of FIG. 7 or reference numbers 940 and 945 of FIG. 9, as well as in connection with FIGS. 8 and 10.

Process 1200 may include additional aspects, such as any single aspect or any combination of aspects described below and/or in connection with one or more other processes described elsewhere herein.

In a first aspect, process 1200 includes monitoring for the DCI within a time window having a size that is based at least in part on dynamic grants that can be received before and after an SPS occasion.

In a second aspect, alone or in combination with the first aspect, process 1200 includes decreasing a monitoring periodicity within the time window when not receiving an SPS occasion, and increasing the monitoring periodicity outside the time window.

In a third aspect, alone or in combination with one or more of the first and second aspects, the monitoring periodicity or the size of the time window is based at least in part on a periodicity of the periodic application, and the periodic application may be an XR application.

In a fourth aspect, alone or in combination with one or more of the first through third aspects, the size of the time window is based at least in part on one or more of a latency parameter or a power consumption parameter.

In a fifth aspect, alone or in combination with one or more of the first through fourth aspects, process 1200 includes receiving a waveform sequence, DCI, or a MAC CE, that indicates that a next SPS occasion is to be skipped, and skipping monitoring in the next SPS occasion.

In a sixth aspect, alone or in combination with one or more of the first through fifth aspects, process 1200 includes receiving a waveform sequence, DCI, or a MAC CE that activates preconfigured dynamic grants after the SPS occasion.

In a seventh aspect, alone or in combination with one or more of the first through sixth aspects, process 1200 includes receiving a waveform sequence, DCI, or a MAC CE that indicates a change in one or more parameters (e.g., an MCS, a length) of a next SPS occasion, and adjusting how the UE monitors for the next SPS occasion based at least in part on the change in the one or more parameters of the next SPS occasion.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
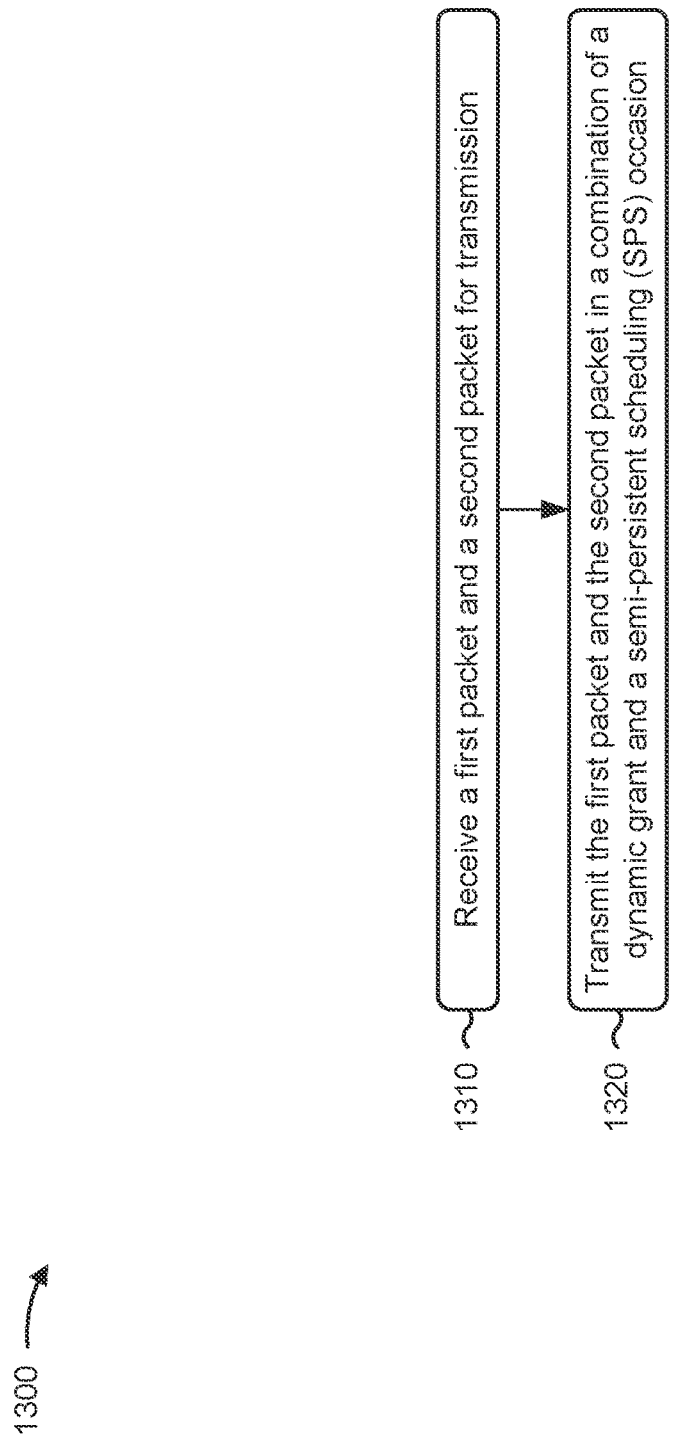
FIG. 13 is a diagram illustrating an example process performed, for example, by a network entity, in accordance with the present disclosure.

FIG. 13 is a diagram illustrating an example process 1300 performed, for example, by a network entity, in accordance with the present disclosure. Example process 1300 is an example where the network entity (e.g., network node 110, a network entity 710) performs operations associated with using a combination of scheduling resources.

As shown in FIG. 13, in some aspects, process 1300 may include receiving a first packet and a second packet for transmission during a period for a periodic application (block 1310). For example, the network entity (e.g., using communication manager 1508 and/or reception component 1502 depicted in FIG. 15) may receive a first packet and a second packet for transmission during a period for a periodic application, as described above, for example, in connection with reference number 735 of FIG. 7 or reference number 935 of FIG. 9. The periodic application may be an XR application, and the first packet and the second packet may be part of XR data.

As further shown in FIG. 13, in some aspects, process 1300 may include transmitting the first packet and the second packet in a combination of a dynamic grant and an SPS occasion (block 1320). For example, the network entity (e.g., using communication manager 1508 and/or transmission component 1504 depicted in FIG. 15) may transmit the first packet and the second packet in a combination of a dynamic grant and an SPS occasion, as described above, for example, in connection with reference numbers 740 and 745 of FIG. 7 or reference numbers 940 and 945 of FIG. 9, as well as in connection with FIGS. 8 and 10.

Process 1300 may include additional aspects, such as any single aspect or any combination of aspects described below and/or in connection with one or more other processes described elsewhere herein.

In a first aspect, process 1300 includes selecting the dynamic grant or the SPS occasion for the first packet based at least in part on a time duration between arrival of the first packet and the SPS occasion.

In a second aspect, alone or in combination with the first aspect, the selecting includes selecting the dynamic grant for the first packet in response to the time duration satisfying a time duration threshold, and selecting the SPS occasion for the first packet in response to the time duration not satisfying the time duration threshold.

In a third aspect, alone or in combination with one or more of the first and second aspects, the time duration threshold is less than or equal to a packet delay budget for the first packet.

In a fourth aspect, alone or in combination with one or more of the first through third aspects, the transmitting includes transmitting the first packet in both the dynamic grant and the SPS occasion based at least in part on a size of the first packet satisfying a size threshold.

In a fifth aspect, alone or in combination with one or more of the first through fourth aspects, the transmitting includes transmitting the second packet with the first packet in the dynamic grant or the SPS occasion.

In a sixth aspect, alone or in combination with one or more of the first through fifth aspects, the transmitting includes transmitting the first packet in the dynamic grant and the second packet in the SPS occasion, or transmitting the first packet in the SPS occasion and the second packet in the dynamic grant.

In a seventh aspect, alone or in combination with one or more of the first through sixth aspects, process 1300 includes transmitting a waveform sequence, DCI, or a MAC CE that indicates that a next SPS occasion is to be skipped in response to no packet being received for transmission in the next SPS occasion.

In an eighth aspect, alone or in combination with one or more of the first through seventh aspects, the SPS occasion includes an indication of a next dynamic grant and an indication that DCI for the next dynamic grant is to be skipped.

In a ninth aspect, alone or in combination with one or more of the first through eighth aspects, process 1300 includes transmitting a waveform, DCI, or a MAC CE that indicates a next dynamic grant or that indicates a next SPS occasion is to be skipped.

In a tenth aspect, alone or in combination with one or more of the first through ninth aspects, process 1300 includes transmitting a waveform sequence, DCI, or a MAC CE that indicates a change in one or more parameters (e.g., an MCS, a length) of a next SPS occasion.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

It should be noted that any one or more features, described with regard to one or more of FIGS. 14-23, can be implemented as part of any one or more examples described with regard to FIGS. 7-13.

SPS provides a mechanism for allocating periodic resources for communication, such as between a UE and a network node (e.g., a network node 110, a component of a disaggregated base station). A periodic resource (referred to herein as an SPS occasion) is configured by an SPS configuration with a set of parameters, such as a periodicity, an MCS, a hybrid automatic repeat request (HARQ) process identifier, a physical uplink control channel (PUCCH) resource for returning feedback regarding a communication on an SPS occasion, and so on. Thus, an SPS configuration may be associated with recurring SPS occasions defined by the set of parameters. Once the SPS configuration is activated, the UE may perform a communication on an SPS occasion associated with the activated SPS configuration. For example, the UE may receive a transmission from a network node on an SPS occasion. SPS configuration and communication may be well-suited for communications involving bursts of data activity, such as Voice over New Radio (VoNR). A configured grant (CG) is similar to an SPS configuration. A CG is configured with a recurring grant for uplink communication based at least in part on a set of parameters. References herein to SPS configuration and/or communication should be understood to also encompass CG configuration and/or communication.

Communications via a network may involve some amount of jitter. Jitter is a variation or uncertainty in the arrival time of a communication. For example, a jitter value may indicate an expected or observed deviation of an actual arrival time of a packet relative to a scheduled arrival time of the packet. Jitter can involve a communication arriving earlier than expected, or later than expected. For example, a communication associated with some amount of jitter may arrive before a scheduled resource, during the scheduled resource, or after a scheduled resource. Jitter can be caused by processing timelines, network congestion, route changes, and so on.

Some types of communications may be negatively impacted by jitter. For example, XR communications (described in more detail elsewhere herein) involve transmission and reception of a number of packets in a periodic fashion. Thus, an SPS configuration may be useful for XR communications, since the SPS configuration may provide a periodic SPS occasion on which to transmit or receive XR communications. XR communications may involve bursty communication, wherein the communications are performed via intermittent traffic bursts including one or more packets. In the context of XR, a traffic burst may represent a rendered scene. In some aspects, a traffic burst is a communication or a portion of a communication including one or more packets. A communication may be performed via periodic traffic bursts, which may be performed according to a period for a periodic application, described elsewhere herein. Such a communication may be characterized by relatively short traffic bursts separated by relatively long periods of inactivity, which makes such communications suitable for SPS. However, the jittery nature of communications via a wireless network, such as a 5G/NR network, may lead to packets for XR communications being received before or after an SPS occasion configured for the XR communications. Furthermore, in some cases, the amount of traffic to be transmitted at a given time (e.g., in a traffic burst) may exceed the capacity of an SPS occasion associated with the given time. Still further, the periodicity of XR communication packets may be different than typical values for SPS communication, such as due to the periodicity of XR communication packets being related to the framerate of the XR device. Still further, XR traffic may be configured with multiple flows, which may have variable parameters and characteristics. Packets being received outside of an SPS occasion configured for the XR communications, and overwhelming the capacity of a given SPS occasion, may lead to delays in XR communication, diminished throughput, and degraded user experience.

Some techniques and apparatuses described herein enable configuration of multiple SPS configurations, such as a first SPS configuration and one or more second SPS configurations. The one or more second SPS configurations may configure SPS occasions that are within a time interval associated with a traffic burst relative to an SPS occasion configured by the first SPS configuration. For example, the one or more second SPS configurations may configure SPS occasions that are within a range of an expected jitter of a communication, relative to an SPS occasion configured by the first SPS configuration. For example, if a communication is associated with a jitter of +/−(plus or minus) 5 ms, then the SPS occasions configured by the one or more second SPS configurations may be within 5 ms of the first SPS occasion (before and/or after the first SPS occasion). Furthermore, some techniques and apparatuses described herein provide signaling associated with configuring multiple SPS configurations for a communication associated with jitter, such as feedback resource configuration and piggybacking of data on feedback regarding the communication. In this way, delays in communication associated with jitter (such as XR communications) are reduced, throughput is improved, and user experience is improved. User experience may be particularly improved for XR communications, where users are sensitive to issues caused by delays in communications.

Figure 14:
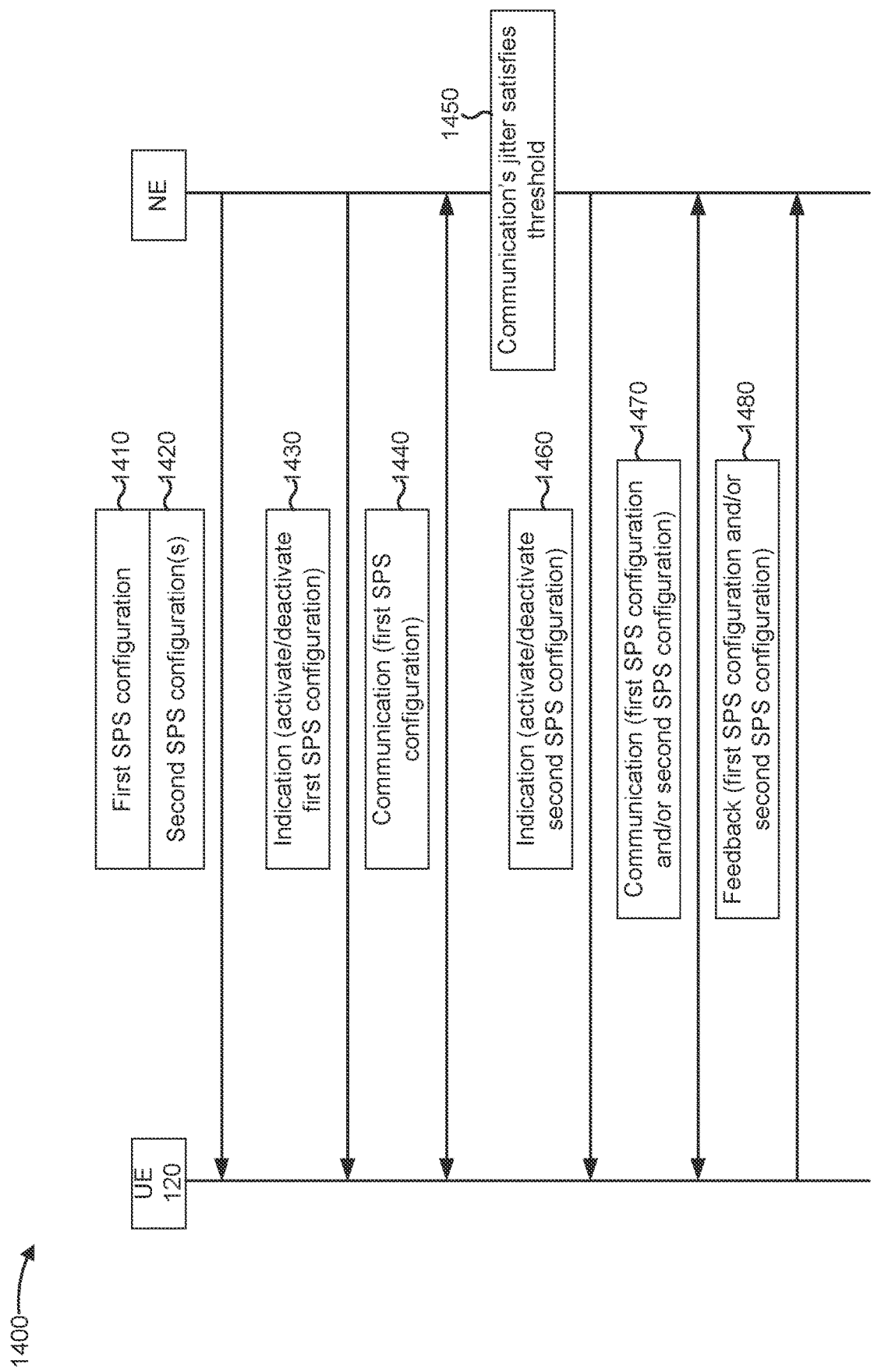
FIG. 14 is a diagram illustrating an example of signaling associated with configuring multiple SPS configurations for a communication, in accordance with the present disclosure.

FIG. 14 is a diagram illustrating an example 1400 of signaling associated with configuring multiple SPS configurations for a communication, in accordance with the present disclosure. As shown, example 1400 includes a UE 120 and a network node 110. The UE 120 and the network node 110 may perform a communication with each other. In some cases, the communication may be subject to some amount of jitter. In some aspects, the communication is an XR communication. "XR" is a term referring to real-and-virtual combined environments and human-machine interactions generated by computer technology and wearables. Non-exhaustive examples of XR include augmented reality, mixed reality, and virtual reality. XR may involve some amount of network communication. An XR communication is a transmission or series of transmissions (e.g., a data flow) associated with an XR application, such as a data flow carrying XR data. For example, in some implementations, some amount of processing may be performed at a server, such as to generate a scene (e.g., frame) which is communicated to the UE via a traffic burst. As another example, a UE may access data stored remotely to the UE for use in an XR environment. Techniques and apparatuses described herein provide resilience for XR communications involving jitter by configuring (and optionally activating) multiple SPS occasions within a time window associated with jitter.

As shown in FIG. 14, and by reference numbers 1410 and 1420, the network node 110 may provide, to the UE 120, configuration information. For example, the network node 110 may provide the configuration information via radio resource control (RRC) signaling, medium access control (MAC) signaling, or the like. The configuration information may indicate a first SPS configuration (shown by reference number 1410) and one or more second SPS configurations (shown by reference number 1420, and sometimes referred to herein as "a/the second SPS configuration" for brevity). In some aspects, the network node 110 may configure the first SPS configuration and the second SPS configuration based at least in part on the UE 120 signaling capability information indicating that the UE 120 supports SPS. In some aspects, the UE 120 may signal capability information indicating that the UE 120 supports multiple SPS occasions within a time window associated with jitter of a communication, and the network node 110 may configure the first SPS configuration and the second SPS configuration based at least in part on the capability information. As used herein, "SPS configurations," "SPS communications," and "SPS occasions" can refer to downlink SPS configurations, communications, and occasions, uplink SPS configurations, communications, and occasions, or CG configurations, communications, and occasions.

In some aspects, the network node 110 may provide the first SPS configuration with the second SPS configuration, such as via a single RRC message. In some other aspects, the network node 110 may provide the first SPS configuration separately from the second SPS configuration. For example, the network node 110 may first configure the first SPS configuration and may use the first SPS configuration for communication with the UE 120. The network node 110 may determine that the communication's jitter satisfies a threshold, such as shown by reference number 1450. The network node 110 may then configure (and optionally activate) the second SPS configuration based at least in part on the communication's jitter satisfying the threshold. Configuring the first SPS configuration and the second SPS configuration contemporaneously may conserve signaling resources, whereas configuring the first SPS configuration and the second SPS configuration separately may improve communication resource flexibility.

An SPS configuration (such as the first SPS configuration or the second SPS configuration) may include a set of SPS parameters. An SPS parameter may include, for example, a resource for one or more SPS occasions configured by the SPS configuration, a periodicity (e.g., a time interval between consecutive SPS occasions), a number of HARQ processes for the SPS occasions, a PUCCH resource for feedback associated with the SPS occasion, an MCS for communication on the SPS occasion, or other parameters described elsewhere herein. In some aspects, one or more of the SPS parameters may be shared between (e.g., the same for) the first SPS configuration and the second SPS configuration. For example, the first SPS configuration and the second SPS configuration may have the same periodicity, the same MCS, or the like. In some other aspects, a first SPS configuration and a second SPS configuration may be associated with a different SPS parameter. For example, a first SPS configuration may be configured with a lower MCS (corresponding to higher reliability and lower data rate), whereas a second SPS configuration may be configured with a higher MCS (corresponding to lower reliability and a higher data rate). As another example, a first SPS configuration may be associated with a longer periodicity (such as for a first type of traffic with a first periodicity), and a second SPS configuration may be associated with a shorter periodicity (such as for a second type of traffic with a second periodicity).

In some aspects, multiple SPS configurations (such as the first SPS configuration and the second SPS configuration) may be associated with a traffic flow. For example, an XR communication may be associated with an XR traffic flow, such as a quality of service (QoS) flow or the like. The multiple SPS configurations may be associated with (e.g., explicitly or implicitly) the traffic flow. For example, the multiple SPS configurations may be configured based at least in part on a periodicity, jitter, data rate, or number of packets per traffic burst of the traffic flow. Thus, a traffic flow can use multiple SPS configurations with variable SPS parameters (e.g., MCS, periodicity, and so on).

In some aspects, an XR communication may be associated with multiple traffic flows, such as a first flow for audio data, a second flow for video data, and/or a third flow for haptic data. In some aspects, each traffic flow of the XR communication may be configured with one or more SPS configurations (e.g., a different set of SPS configurations for each traffic flow), which provides flexibility for accounting for differences between each traffic flow in terms of periodicity, data rate, and so on. For example, the first SPS configuration and the second SPS configuration may be associated with a same traffic flow. In some aspects, multiple SPS configurations may be associated with the XR communication, and may collectively facilitate the multiple traffic flows (e.g., an SPS configuration may not be specific to a traffic flow), which simplifies configuration of the multiple SPS configurations.

In some aspects, SPS occasions of the first SPS configuration and the second SPS configuration may both be activatable or de-activatable via an indication (such as the indication shown by reference number 1430 or the indication shown by reference number 1460). In some other aspects, the first SPS configuration may be activatable via traditional downlink control information (DCI) signaling, and SPS occasions the second SPS configuration may be activatable or de-activatable via an indication. For example, the first SPS configuration may be configured and then activated by DCI. If the network node 110 determines that additional SPS occasions within a traffic burst are needed (as described with respect to reference number 1450), the network node 110 may activate an SPS occasion of a second SPS configuration within the traffic burst. Thus, the first SPS configuration may be considered a "static" SPS configuration, and the second SPS configuration may be considered an indicator enabled SPS configuration.

As described herein, an indication can activate or deactivate an SPS configuration, or can activate or deactivate one or more SPS occasions of the SPS configuration. For example, an indication (such as shown by reference numbers 1430 or 1460) can activate an SPS configuration's SPS occasion for transmission or reception. In some examples, a next SPS occasion after the activated SPS occasion may be inactive (e.g., the SPS configuration may return to a prior state after the activated SPS occasion has elapsed). In some other examples, a next SPS occasion after the activated SPS occasion may also be active (e.g., the SPS configuration may be activated or deactivated by an indication until a subsequent indication is received). As another example, an indication (such as shown by reference numbers 1430 or 1460)

can deactivate an SPS configuration's SPS occasion for transmission or reception. In some examples, a next SPS occasion after the deactivated SPS occasion may be active (e.g., the SPS configuration may return to a prior state after the deactivated SPS occasion has elapsed). In some other examples, a next SPS occasion after the deactivated SPS occasion may also be inactive (e.g., the SPS configuration may be activated or deactivated by an indication until a subsequent indication is received).

In some aspects, an SPS occasion (e.g., of the first SPS configuration or the second SPS configuration) may be deactivated by default. For example, an SPS configuration (or one or more of the SPS configuration's SPS occasions) may be deactivated by default after being configured, and may be activated via an indication. In some aspects, an SPS occasion (e.g., the first SPS configuration or the second SPS configuration) may be activated by default. For example, an SPS configuration (or one or more of the SPS configuration's SPS occasions) may be activated by default after being configured (such that the UE 120 monitors for downlink transmissions on the SPS occasions, or can perform uplink transmission on the SPS occasions), and may be deactivated via an indication. Thus, unnecessary SPS occasion decoding is reduced, thereby conserving UE resources.

Figure 15:
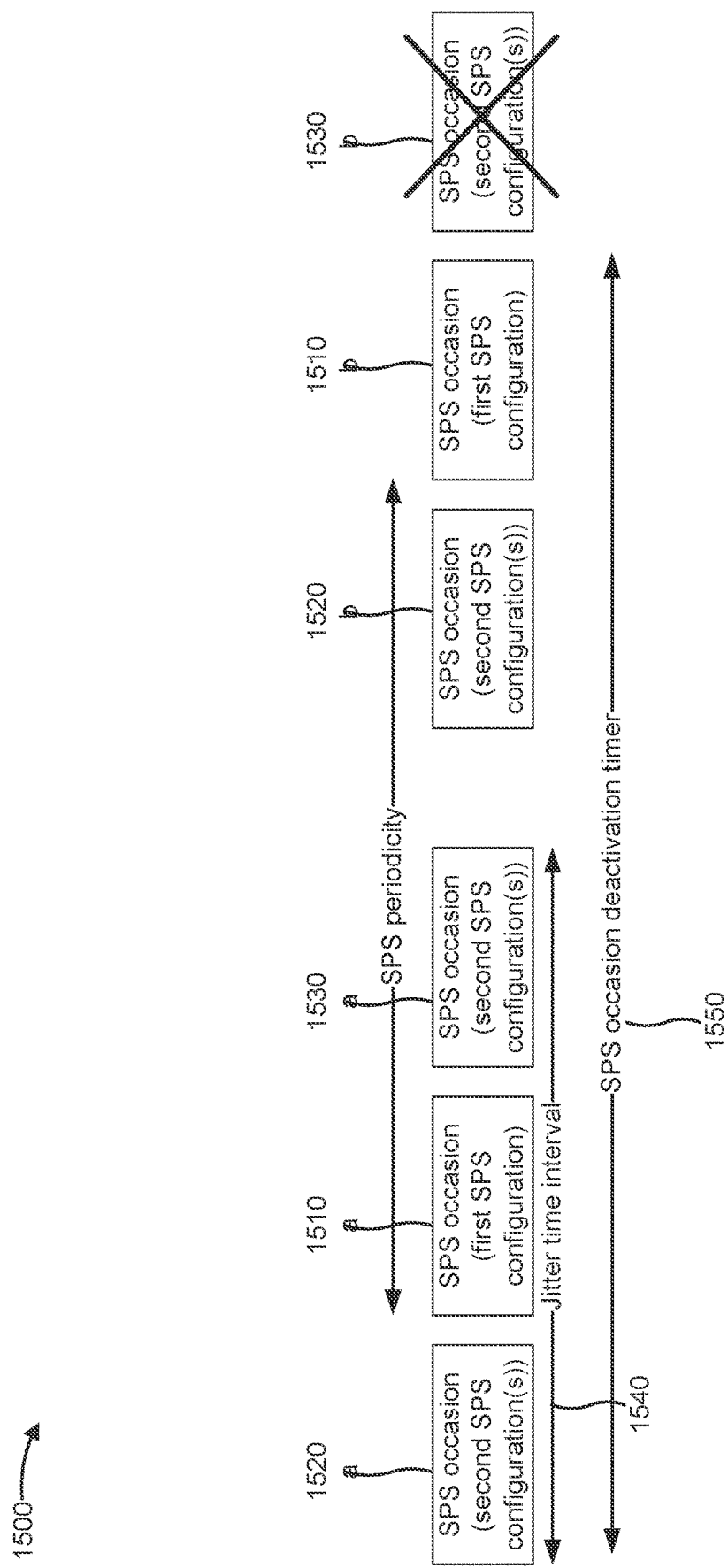
FIG. 15 is a diagram illustrating an example of SPS occasions associated with a first SPS configuration and one or more second SPS configurations, in accordance with the present disclosure.

FIG. 15 is a diagram illustrating an example 1500 of SPS occasions associated with a first SPS configuration and one or more second SPS configurations, in accordance with the present disclosure. Two SPS occasions configured by a first SPS configuration are shown by reference numbers 1510*a* and 1510*b*. A first pair of SPS occasions configured by one second SPS configuration are shown by reference numbers 1520*a* and 1520*b*, and a second pair of SPS occasions configured by another second SPS configuration are shown by reference numbers 1530*a* and 1530*b*. As shown, each of the SPS configurations is associated with a same SPS periodicity. In some aspects, a single SPS configuration may configure an SPS occasion 1520 and an SPS occasion 1530.

As shown, the SPS occasions of example 1500 occur within a time interval, shown by reference number 1540. This time interval may be associated with a traffic burst of the communication. For example, the time interval may be based at least in part on an amount of jitter associated with the communication and/or based at least in part on a length and/or a scheduled or expected arrival time of a traffic burst of the communication. In some aspects, the time interval may be configured to include a length of time associated with an expected jitter of a traffic burst, and may be centered on a scheduled or expected arrival time of the traffic burst. For example, the SPS occasions 1520 occur before the SPS occasions 1510 and within the time interval, and the SPS occasions 1530 occur after the SPS occasions 1510 and within the time interval. In some aspects, the network node 110 may determine the time interval. For example, the network node 110 may determine information regarding jitter (such as statistics regarding arrival time or deviation from an expected arrival time), such as based at least in part on times at which communications to the UE 120 transmitted on an SPS occasion are received. The network node 110 may determine the time interval based at least in part on the information regarding jitter. For example, the network node 110 may set the time interval so that each SPS occasion of the first SPS occasion 1510*a* and the one or more second SPS occasions 1520*a* and 1530*a* are included within an observed range of jitter, within a range defined by a standard deviation associated with the jitter, or the like.

There may be a maximum number of SPS configurations for a given UE 120. This maximum number may indicate how many SPS configurations the UE 120 can be concurrently configured with. If the UE 120 reaches the maximum number of SPS configurations, then one or more SPS configurations may need to be de-configured before any more SPS configurations can be configured. In some deployments, the maximum number of SPS configurations is 8. In some aspects, the maximum number of SPS configurations may be greater than 8 (e.g., 16, 24, 32, or the like). Increasing the maximum number of SPS configurations from 8 to a larger number than 8 may facilitate the configuration of SPS configurations for multiple flows of XR traffic (such as a haptic data flow, a video data flow, an audio data flow, and so on).

As shown by reference number 1550, in some examples, the first SPS configuration and the one or more second SPS configurations may be associated with a deactivation time interval. A deactivation time interval may indicate a length of time. After the length of time has elapsed, an SPS configuration may be released or SPS occasions of the SPS configuration may be deactivated. For example, if SPS occasions of an SPS configuration are not used for the length of the deactivation time interval, then the UE 120 and the network node 110 may release the SPS configuration or deactivate the SPS configuration (that is, one or more SPS occasions of the SPS configuration). In some aspects, the deactivation time interval may be specific to an SPS configuration. For example, the UE 120 may release or deactivate the first SPS configuration only if SPS occasions 1510 are unused for the length of the deactivation time interval without regard for whether SPS occasions 1520 and 1530 are used. In some other aspects, the deactivation time interval may not be specific to an SPS configuration. For example, the UE 120 may release or deactivate any SPS configuration of the SPS configurations associated with SPS occasions 1510, 1520, and 1530, after none of the SPS occasions 1510, 1520, and 1530 are used for the duration of the deactivation time interval. The usage of the deactivation time interval may provide for deactivation or release of SPS occasions that are not frequently used.

Returning to FIG. 14, as shown by reference number 1430, the UE 120 may receive, from the network node 110, a first indication. The first indication may indicate to activate the first SPS configuration or an SPS occasion of the first SPS configuration. For example, the network node 110 may transmit the first indication based at least in part on initiating or continuing the XR communication.

In some aspects, the first SPS configuration (and the one or more second SPS configurations) may have a periodicity equal to or based at least in part on a length of a periodicity associated with the XR communication. For example, the XR communication may have a periodicity based at least in part on a framerate of an XR application, such as 16.67 ms (corresponding to 60 frames per second), 11.11 ms (corresponding to 90 frames per second), or 8.33 ms (corresponding to 120 frames per second), among other examples. The first SPS configuration and/or the one or more second SPS configurations may be configured with a periodicity that matches a periodicity of the XR communication, or that is based at least in part on a periodicity of the XR communication (for example, the periodicity of the first SPS configuration and/or the one or more second SPS configurations may be divisible by the periodicity of the XR communication).

As shown by reference number 1440, the UE 120 and the network node 110 may perform a communication using the first SPS configuration. For example, the UE 120 may transmit, and the network node 110 may receive, uplink communications on one or more SPS occasions defined by the first SPS configuration based at least in part on the first SPS configuration or the one or more SPS occasions being activated. As another example, the network node 110 may transmit, and the UE 120 may receive, downlink communications on one or more SPS occasions defined by the first SPS configuration based at least in part on the first SPS configuration or the one or more SPS occasions being activated.

As shown by reference number 1450, the network node 110 may determine that the communication's jitter satisfies a threshold. For example, in the case where the first SPS configuration and the second SPS configuration are activated separately from one another, the network node 110 may activate the second SPS configuration based at least in part on determining that the communication's jitter satisfies the threshold. In some aspects, the network node 110 may activate the second SPS configuration based at least in part on determining that the communication exceeds a size that can be conveyed via the first SPS occasion (e.g., based on a number of packets per traffic burst). Thus, using XR traffic awareness, the network node 110 may provide additional flexibility and bandwidth for the communication in the case when the jitter satisfies the threshold or the communication exceeds a size that can be conveyed via the first SPS occasion.

As shown by reference number 1460, the network node 110 may transmit, and the UE 120 may receive, a second indication activating one or more SPS occasions of the one or more second SPS configurations. For example, the network node 110 may transmit the second indication based at least in part on determining that the communication's jitter satisfies the threshold and/or based at least in part on the communication exceeding a size that can be conveyed via the first SPS occasion. In some aspects, the network node 110 may selectively activate a subset of second SPS configurations, for example, based at least in part on a size of the time window associated with jitter, a size of the communication to be performed, or the like.

In some aspects, the network node 110 may activate only one of the first SPS configuration or the second SPS configuration. For example, the network node 110 may deactivate the first SPS configuration prior to or concurrently with activating the second SPS configuration. In some other aspects, both of the first SPS configuration and the second SPS configuration may be active concurrently.

In some aspects, an indication (e.g., the first indication shown by reference number 1430 and/or the second indication shown by reference number 1460) may be provided via DCI. For example, an indication may be signaled via DCI. In some aspects, a flag (e.g., one or more bits) of the DCI may indicate whether a particular SPS configuration or SPS occasion should be activated or deactivated. In some aspects, the DCI may be transmitted on an SPS occasion. For example, the DCI may be piggybacked on an SPS occasion of the first SPS configuration (e.g., a statically configured SPS occasion, as compared to an SPS occasion that can be activated or deactivated via an indication) or the second SPS configuration. In some aspects, indications for multiple SPS occasions and/or SPS configurations may be multiplexed together. For example, multiple indications (e.g., multiple DCI messages carrying the multiple indications) may be multiplexed in a DCI message, which may be referred to as an indication. Thus, overhead is reduced.

In some aspects, an indication (e.g., the first indication shown by reference number 1430 and/or the second indication shown by reference number 1460) may be provided via a medium access control (MAC) control element (MAC-CE). For example, the MAC-CE may be provided (e.g., piggybacked) on a physical downlink shared channel (PDSCH) resource or a physical uplink shared channel (PUSCH) resource. The indication (whether provided via a MAC-CE or a different form of signaling) may activate or deactivate one or more SPS occasions (such as for a particular SPS configuration or across multiple SPS configurations). In some aspects, the MAC-CE may indicate an SPS configuration identifier and/or an SPS occasion identifier, and may indicate whether the indicated SPS configuration identifier and/or SPS occasion identifier is activated or deactivated (e.g., for single carrier communication). In some aspects, the MAC-CE may indicate a carrier for which an indicated SPS configuration identifier is activated or deactivated (e.g., for multiple carrier communication).

In some aspects, an indication (e.g., the first indication shown by reference number 1430 and/or the second indication shown by reference number 1460) may be based at least in part on a sequence used to generate a signal. For example, an indication may be based at least in part on a sequence used to generate a demodulation reference signal (DMRS). In some aspects, a group of DMRS sequences may be used to indicate activation or deactivation of one or more upcoming SPS occasions (such as in a particular SPS configuration or across multiple SPS configurations).

As shown by reference number 1470, the network node 110 and the UE 120 may perform the communication using at least one of the first SPS configuration or the second SPS configuration (referred to herein as "the at least one active SPS configuration"). For example, the UE 120 may transmit, and the network node 110 may receive, the communication on activated SPS occasions of the at least one active SPS configuration. Additionally, or alternatively, the network node 110 may transmit, and the UE 120 may receive, the communication on activated SPS occasions of the at least one active SPS configuration.

In some aspects, as shown by reference number 1480, the UE 120 may transmit feedback regarding the communication. For example, the UE 120 may transmit feedback regarding communications on SPS occasions associated with the at least one active SPS configuration. As mentioned above, resources for the feedback regarding the communication may be configured by the network node 110, such as in association with the first SPS configuration and/or the second SPS configuration.

The feedback transmitted by the UE 120 may be associated with a HARQ process identifier (sometimes referred to as a "HARQ ID"). The HARQ process identifier may be a property of the SPS occasion to which the feedback relates. The SPS occasions of the first SPS configuration, and the SPS occasions of the second SPS configuration(s), may be associated with HARQ process identifiers. In the case where only one of the first SPS configuration or a second SPS configuration is active, the HARQ process identifier allocation (which may be based at least in part on an equation) may be unaffected.

In some aspects, in the case where both of the first SPS configuration and a second SPS configuration are active, the network node 110 may use a HARQ assignment pool. For example, HARQ process IDs of the first SPS configuration and the second SPS configuration may be selected from the same pool of HARQ process identifiers. In some aspects, the UE 120 and the network node 110 may assign HARQ process identifiers based at least in part on a pre-defined rule (as described in more detail below). For example, the UE 120 and the network node 110 may identify a HARQ process identifier, of the HARQ assignment pool, to assign to a particular SPS occasion by reference to the rule.

In some aspects, the HARQ assignment pool may be a hybrid HARQ assignment pool. A hybrid HARQ assignment pool may include a first pool of HARQ process identifiers and a second pool of HARQ process identifiers. The first pool of HARQ process identifiers may be used for the SPS occasions of the first SPS configuration, and the second pool of HARQ process identifiers may be assigned to SPS occasions associated with the second SPS configuration, if the second SPS configuration is activated. As one example, the first pool of HARQ process identifiers may include HARQ process identifiers 0 through 7, and the second pool of HARQ process identifiers may include HARQ process identifiers 8 through 15. In some aspects, the second pool of HARQ process identifiers may be defined based at least in part on an offset. For example, if the first pool of HARQ process identifiers includes HARQ process identifiers 0 through 7, and the second pool of HARQ process identifiers includes HARQ process identifiers 8 through 15, the offset may be 8. In some aspects, the offset may be signaled via DCI (e.g., indicated in the first DCI or the second DCI). In some aspects, SPS HARQ identifiers (e.g., SPS HARQ identifiers for DCI-enabled SPS occasions) may be based at least in part on an equation (e.g., a HARQ ID assignment equation specified in a wireless communication specification) or a random assignment using a pre-determined rule, which may be agreed on and followed by both the network node 110 and the UE 120. For example, both the network node 110 and the UE 120 may agree, at each instance, to assign the lowest available ID to the current SPS occasion.

In some aspects, HARQ process identifiers are assigned separately for the first SPS configuration and the second SPS configuration. For example, enabled SPS configurations may use an SPS configuration HARQ process ID equation separately for each SPS configuration. HARQ process IDs corresponding to unused SPS occasions may be ignored.

In some aspects, an indication activating an SPS occasion or SPS configuration may indicate a HARQ process ID. For example, for a DCI enabled SPS configuration (of the first SPS configuration or a second SPS configuration), the HARQ process ID for the SPS configuration may be signaled to the UE 120 with the indication (e.g., DCI) that is used for activation of the SPS configuration or SPS occasion. As another example, a HARQ process ID for an SPS occasion may be signaled to the UE with DCI that is used for activation of the SPS occasion.

Figure 16:
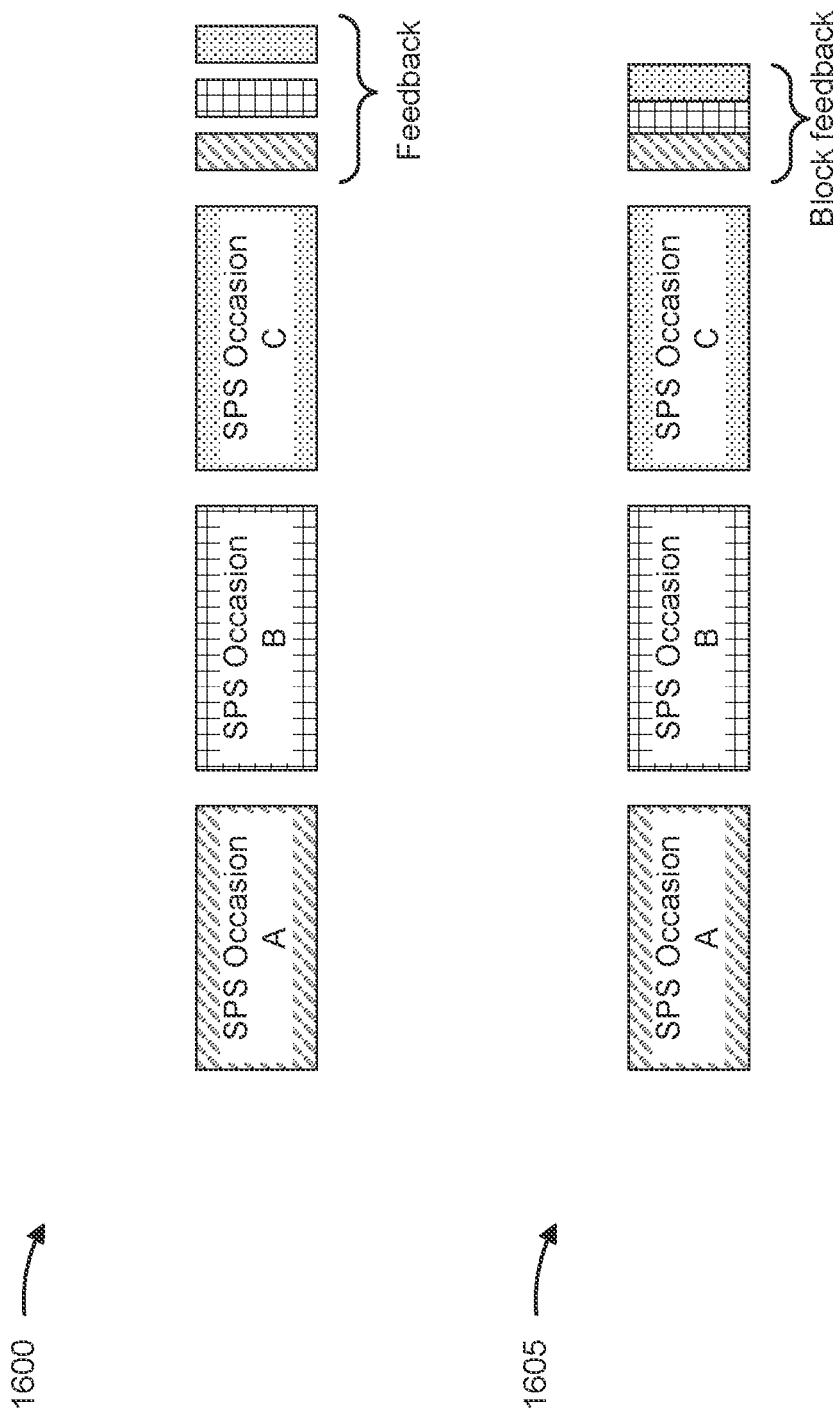
FIG. 16 is a diagram illustrating examples of feedback resources for multiple SPS occasions within a time window associated with jitter, according to the present disclosure.

FIG. 16 is a diagram illustrating examples 1600 and 1605 of feedback resources for multiple SPS occasions within a time window associated with jitter, according to the present disclosure. Example 1600 shows an SPS Occasion A, an SPS Occasion B, and an SPS occasion C. SPS Occasion B may be defined by a first SPS configuration, and SPS Occasions A and C may be defined by one or more second SPS configurations. In examples 1600 and 1605, a feedback occasion associated with an SPS occasion uses the same fill as the SPS occasion.

In example 1600, the network node 110 may indicate a respective feedback resource (e.g., a respective PUCCH resource) for each SPS occasion. For example, in example 1600, SPS Occasion A, SPS Occasion B, and SPS Occasion C are each associated with a respective feedback resource. In some aspects, each SPS occasion associated with a particular SPS configuration may be configured with a respective feedback resource. For example, each occurrence of SPS Occasion B (corresponding to the first SPS configuration) may be configured with a corresponding feedback resource. By configuring individual PUCCH resources for each SPS occasion, delay associated with feedback for SPS communications may be reduced.

In example 1605, the network node 110 may indicate a combined feedback resource for block feedback regarding multiple SPS resources. "Block feedback" is feedback regarding multiple communications that is transmitted on a single channel (such as a single PUCCH). In some aspects, the network node 110 may configure block feedback if there are multiple SPS configurations active. For example, if the first SPS configuration and one or more second SPS configurations are active, then the network node 110 may configure block feedback such that feedback regarding each of the multiple SPS configurations can be provided in a single PUCCH transmission.

In some aspects, the resource for the block feedback may be a PUCCH resource assigned for an initial SPS occasion (such as an earliest SPS occasion in time, or an SPS occasion associated with a first SPS configuration). In this case, the UE 120 may compress the block feedback regarding the multiple SPS configurations so that the block feedback can be transmitted on the PUCCH resource. In some other aspects, the resource for the block resource may at least partially overlap the resource assigned for the initial SPS occasion and may have an increased size relative to the resource assigned for the initial SPS occasion. In this case, the resources of the PUCCH resource can be signaled with the DCI activating the first SPS configuration and/or the second SPS configuration. For example, the DCI may indicate the resources of the PUCCH resource.

In some aspects, the UE 120 may transmit, on a feedback resource, information regarding a future uplink or downlink transmission (e.g., a future communication). For example, the UE 120 may transmit the information regarding the future uplink or downlink transmission if such information is available to or controlled by the UE 120. As one example, the UE 120 may determine that an upcoming downlink transmission is expected to be larger than a threshold size. For an XR communication, this determination may be based at least in part on information associated with a wearable device, such as pose information (e.g., information indicating a position, an orientation, or a rate of change of position or orientation of the wearable device). In this case, the UE 120 may transmit an indication that the upcoming downlink transmission is expected to be larger than the threshold size via the feedback resource. In some aspects, the information regarding the future uplink or downlink transmission may indicate an SPS configuration to activate for the future uplink or downlink transmission, which SPS occasion to use for the future uplink or downlink transmission, a number of SPS occasions to use or activate for the future uplink or downlink transmission, or the like. In some aspects, the information regarding the future uplink or downlink transmission may be transmitted via a configured grant (CG) transmission, which is a transmission on a CG resource.

As indicated above, FIGS. 14-16 are provided as one or more examples. Other examples may differ from what is described with regard to FIGS. 14-16.

Figure 17:
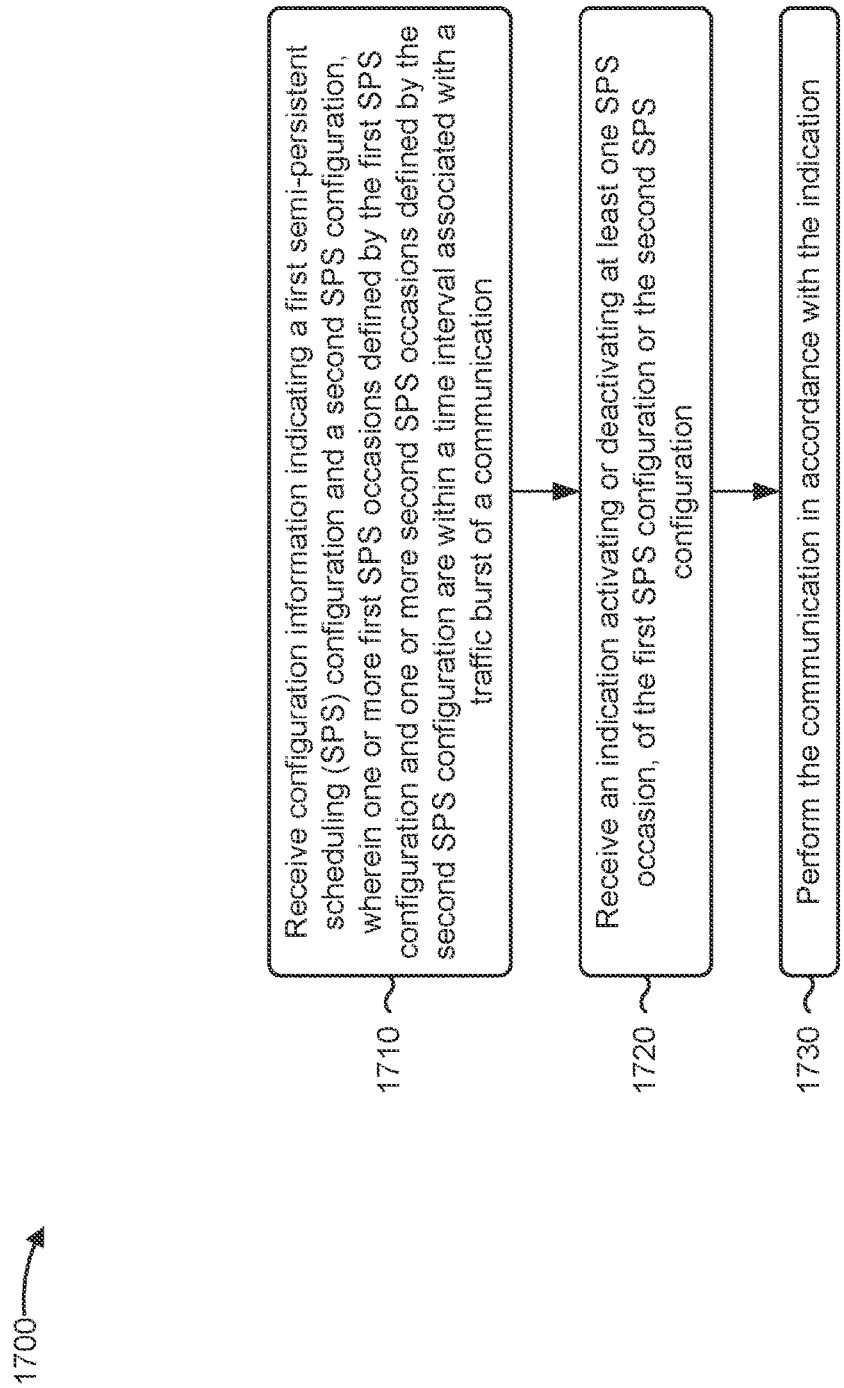
FIG. 17 is a diagram illustrating an example process performed, for example, by a UE, in accordance with the present disclosure.

FIG. 17 is a diagram illustrating an example process 1700 performed, for example, by a UE, in accordance with the present disclosure. Example process 1700 is an example where the UE (e.g., UE 120) performs operations associated with semi-persistent scheduling activation and deactivation.

As shown in FIG. 17, in some aspects, process 1700 may include receiving configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication (block 1710). For example, the UE (e.g., using communication manager 140 and/or reception component 2202, depicted in FIG. 22) may receive configuration information indicating a first SPS configuration (e.g., shown by reference number 1410 of FIG. 14) and a second SPS configuration (e.g., shown by reference number 1420 of FIG. 14), wherein one or more first SPS occasions defined by the first SPS configuration and one or more second SPS occasions defined by the second SPS configuration are within a time interval associated with a traffic burst of a communication, as described above. As noted above, "SPS" can refer to downlink SPS, uplink SPS, or CGs. "Configuration information" may be referred to herein as a configuration, such as a configuration associated with a set of SPS resources or a configuration associated with a set of supplementary resources. For example, the second SPS configuration may be referred to as a configuration associated with a set of supplementary resources. The one or more second SPS occasions may be referred to herein as a set of supplementary resources. The one or more first SPS occasions may be referred to herein as a set of configured periodic resources, as SPS resources, or as CG resources. The traffic burst may be referred to herein as a data packet burst.

As further shown in FIG. 17, in some aspects, process 1700 may include receiving an indication activating or deactivating at least one SPS occasion, of the first SPS configuration or the second SPS configuration (block 1720). For example, the UE (e.g., using communication manager 140 and/or reception component 2202, depicted in FIG. 22) may receive an indication (e.g., indication 1430) activating or deactivating at least one SPS occasion, of the first SPS configuration or the second SPS configuration, as described above. The indication may be referred to or associated with a state change. For example, the state change may be triggered by an explicit state change indication.

As further shown in FIG. 17, in some aspects, process 1700 may include performing the communication in accordance with the indication (block 1730). For example, the UE (e.g., using communication manager 140, reception component 2202, and/or SPS component 2214, depicted in FIG. 22) may perform the communication (as shown by reference number 1470) in accordance with the indication, as described above.

Process 1700 may include additional aspects, such as any single aspect or any combination of aspects described below and/or in connection with one or more other processes described elsewhere herein.

In a first aspect, an SPS occasion, of the one or more second SPS occasions, occurs before the one or more first SPS occasions and within the time interval, or after the one or more first SPS occasions and within the time interval.

In a second aspect, alone or in combination with the first aspect, the indication comprises a first indication activating or deactivating the first SPS configuration, and a second indication activating or deactivating the second SPS configuration.

In a third aspect, alone or in combination with one or more of the first and second aspects, the first SPS configuration and the second SPS configuration are associated with one or more of a same periodicity, or a same modulation and coding scheme.

In a fourth aspect, alone or in combination with one or more of the first through third aspects, process 1700 includes deactivating (e.g., using communication manager 140 or SPS component 2214) the second SPS configuration after a deactivation time interval has elapsed without the UE communicating on the one or more second SPS occasions.

In a fifth aspect, alone or in combination with one or more of the first through fourth aspects, HARQ process identifiers are assigned separately for the first SPS configuration and the second SPS configuration.

In a sixth aspect, alone or in combination with one or more of the first through fifth aspects, the indication activates the at least one SPS configuration, and the indication indicates a HARQ process identifier for the at least one SPS configuration.

In a seventh aspect, alone or in combination with one or more of the first through sixth aspects, HARQ process identifiers for the first SPS configuration or the second SPS configuration are selected from a pool of HARQ process identifiers that are shared across the first SPS configuration and the second SPS configuration.

In an eighth aspect, alone or in combination with one or more of the first through seventh aspects, the indication is based at least in part on a sequence used to generate a demodulation reference signal.

In a ninth aspect, alone or in combination with one or more of the first through eighth aspects, the indication is provided via DCI.

In a tenth aspect, alone or in combination with one or more of the first through ninth aspects, the indication comprises a flag of the DCI.

In an eleventh aspect, alone or in combination with one or more of the first through tenth aspects, the DCI is transmitted on an SPS occasion associated with the first SPS configuration or the second SPS configuration.

In a twelfth aspect, alone or in combination with one or more of the first through eleventh aspects, the indication includes multiple multiplexed DCI messages.

In a thirteenth aspect, alone or in combination with one or more of the first through twelfth aspects, the indication is provided via a MAC-CE.

In a fourteenth aspect, alone or in combination with one or more of the first through thirteenth aspects, the time interval associated with the traffic burst of the communication is based at least in part on an expected deviation of an actual arrival time of a packet relative to a scheduled arrival time of the packet.

In a fifteenth aspect, alone or in combination with one or more of the first through fourteenth aspects, the first SPS configuration and the second SPS configuration are inactive prior to receiving the indication.

In a sixteenth aspect, alone or in combination with one or more of the first through fifteenth aspects, the first SPS configuration and the second SPS configuration are active prior to receiving the indication.

In a seventeenth aspect, alone or in combination with one or more of the first through sixteenth aspects, a periodicity of the first SPS configuration or the second SPS configuration is based at least in part on a periodicity of the communication.

In an eighteenth aspect, alone or in combination with one or more of the first through seventeenth aspects, the periodicity of the communication is based at least in part on a framerate of an extended reality application.

In a nineteenth aspect, alone or in combination with one or more of the first through eighteenth aspects, the first SPS configuration and the second SPS configuration are associated with a same traffic flow.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
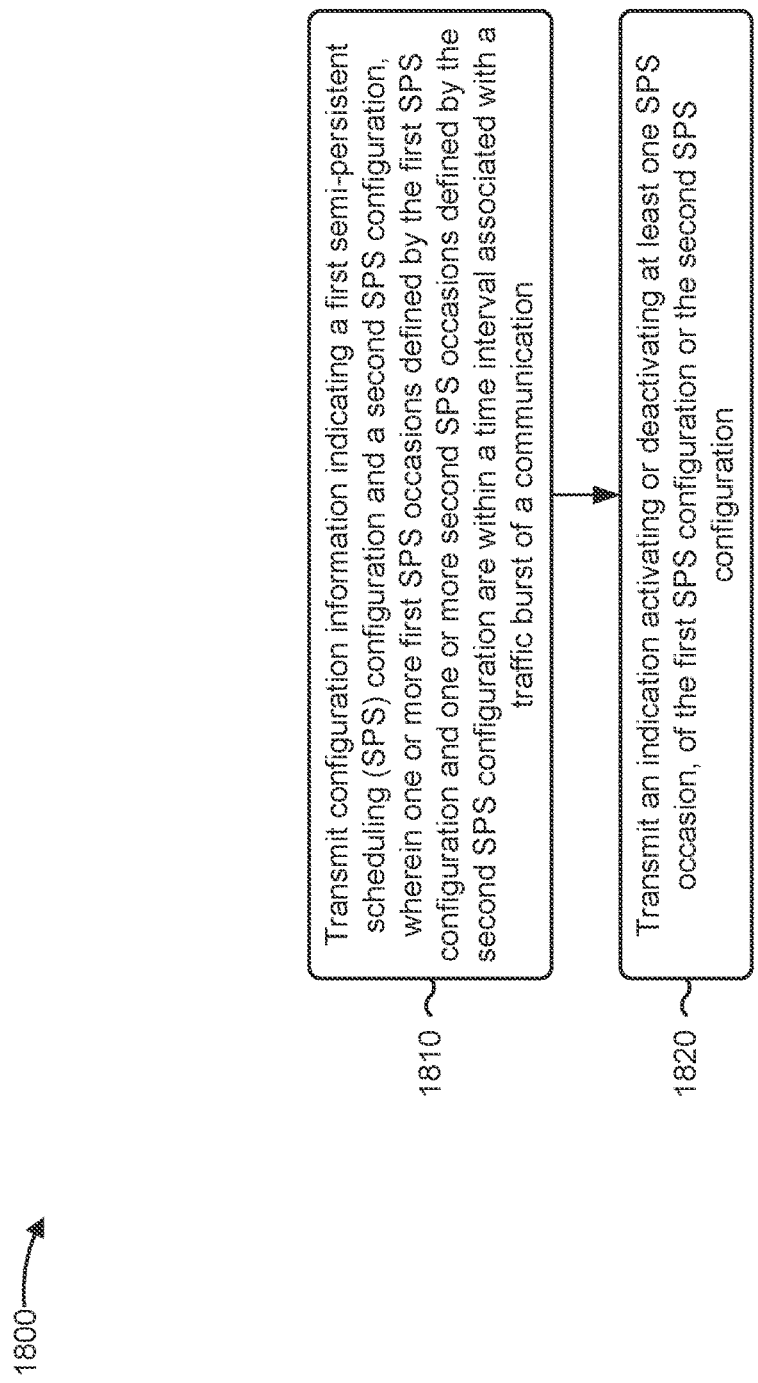
FIG. 18 is a diagram illustrating an example process performed, for example, by a network node, in accordance with the present disclosure.

FIG. 18 is a diagram illustrating an example process 1800 performed, for example, by a network node 110, in accordance with the present disclosure. Example process 1800 is an example where the network node 110 (e.g., network node 110) performs operations associated with semi-persistent scheduling activation and deactivation.

As shown in FIG. 18, in some aspects, process 1800 may include transmitting configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication (block 1810). For example, the network node 110 (e.g., using communication manager 150 and/or configuration component 2312, depicted in FIG. 23) may transmit configuration information indicating a first SPS configuration (shown by reference number 1410) and a second SPS configuration (shown by reference number 1420), wherein one or more first SPS occasions defined by the first SPS configuration and one or more second SPS occasions defined by the second SPS configuration are within a time interval associated with a traffic burst of a communication, as described above.

As further shown in FIG. 18, in some aspects, process 1800 may include transmitting an indication activating or deactivating at least one SPS occasion, of the first SPS configuration or the second SPS configuration (block 1820). For example, the network node 110 (e.g., using communication manager 150 and/or transmission component 2304, depicted in FIG. 23) may transmit an indication (shown by reference number 1430) activating or deactivating at least one SPS occasion, of the first SPS configuration or the second SPS configuration, as described above.

Process 1800 may include additional aspects, such as any single aspect or any combination of aspects described below and/or in connection with one or more other processes described elsewhere herein.

In a first aspect, an SPS occasion, of the one or more second SPS occasions, occurs before the one or more first SPS occasions and within the time interval, or after the one or more first SPS occasions and within the time interval.

In a second aspect, alone or in combination with the first aspect, the indication comprises a first indication activating or deactivating the first SPS configuration, and a second indication activating or deactivating the second SPS configuration.

In a third aspect, alone or in combination with one or more of the first and second aspects, the first SPS configuration and the second SPS configuration are associated with one or more of a same periodicity, or a same modulation and coding scheme.

In a fourth aspect, alone or in combination with one or more of the first through third aspects, process 1800 includes deactivating the second SPS configuration after a deactivation time interval has elapsed without communicating on the one or more second SPS occasions.

In a fifth aspect, alone or in combination with one or more of the first through fourth aspects, HARQ process identifiers are assigned separately for the first SPS configuration and the second SPS configuration.

In a sixth aspect, alone or in combination with one or more of the first through fifth aspects, the indication activates the at least one SPS configuration, and the indication indicates a HARQ process identifier for the at least one SPS configuration.

In a seventh aspect, alone or in combination with one or more of the first through sixth aspects, HARQ process identifiers for the first SPS configuration or the second SPS configuration are selected from a pool of HARQ process identifiers that are shared across the first SPS configuration and the second SPS configuration.

In an eighth aspect, alone or in combination with one or more of the first through seventh aspects, HARQ process identifiers for the first SPS configuration or the second SPS configuration are selected from more than 8 possible HARQ process identifiers.

In a ninth aspect, alone or in combination with one or more of the first through eighth aspects, the indication is based at least in part on a sequence used to generate a demodulation reference signal.

In a tenth aspect, alone or in combination with one or more of the first through ninth aspects, the indication is provided via DCI.

In an eleventh aspect, alone or in combination with one or more of the first through tenth aspects, the indication comprises a flag of the DCI.

In a twelfth aspect, alone or in combination with one or more of the first through eleventh aspects, the DCI is transmitted on an SPS occasion associated with the first SPS configuration or the second SPS configuration.

In a thirteenth aspect, alone or in combination with one or more of the first through twelfth aspects, the indication includes multiple multiplexed DCI messages.

In a fourteenth aspect, alone or in combination with one or more of the first through thirteenth aspects, the indication is provided via a MAC-CE.

In a fifteenth aspect, alone or in combination with one or more of the first through fourteenth aspects, the time interval associated with the traffic burst of the communication is based at least in part on an expected deviation of an actual arrival time of a packet relative to a scheduled arrival time of the packet.

In a sixteenth aspect, alone or in combination with one or more of the first through fifteenth aspects, the first SPS configuration and the second SPS configuration are inactive prior to receiving the indication.

In a seventeenth aspect, alone or in combination with one or more of the first through sixteenth aspects, the first SPS configuration and the second SPS configuration are active prior to receiving the indication.

In an eighteenth aspect, alone or in combination with one or more of the first through seventeenth aspects, a periodicity of the first SPS configuration or the second SPS configuration is based at least in part on a periodicity of the communication.

In a nineteenth aspect, alone or in combination with one or more of the first through eighteenth aspects, the periodicity of the communication is based at least in part on a framerate of an extended reality application.

In a twentieth aspect, alone or in combination with one or more of the first through nineteenth aspects, the first SPS configuration and the second SPS configuration are associated with a same traffic flow.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

It should be noted that any one or more features, described with regard to one or more of FIG. 7-13 or 19-23, can be implemented as part of any one or more examples described with regard to FIGS. 14-18.

Some types of data services can be characterized by data traffic bursts that are periodic but can include some jitter in arrival time. In some data services, the packet sizes or number of packets within a data burst also can be variable. For example, XR data traffic can have these characteristics. XR traffic can include, for example, augmented reality (AR), virtual reality (VR), or mixed reality (MR), among other examples.

Dynamically granted wireless resources can be used to communicate data burst traffic such as, for example, XR data traffic. However, a dynamic grant configuration used for data traffic that is characterized by bursts having jitter, packet number variation, or packet size variation can result in high signaling overhead in control channels and additional power consumption due to increased control channel decoding. Accordingly, configured periodic resources can be used for communicating data traffic bursts. Configured periodic resources include periodic resources such as uplink CG resources or downlink SPS resources. However, since the number of data packets or the size of data packets within a data burst period can be variable, configured periodic resources can be insufficient for communicating all of the data packets in a data burst. Communicating a data packet can refer to transmitting (for example, sending, providing or outputting) a data packet or receiving (for example, obtaining) a data packet.

Particular implementations of the subject matter described in this disclosure can be implemented to realize one or more of the following potential advantages. Some techniques and apparatuses described herein may provide configured supplementary resources that may be used to communicate data packets associated with a data burst for which a configured periodic resource is insufficient. Using a set of supplementary resources may be associated with a state change corresponding to the set of supplementary resources. The state change may include, for example, a triggering of the set of supplementary resources, an activation of the set of supplementary resources, or a deactivation of a set of supplementary resources. Both uplink and downlink supplementary resources may be configured. In this way, supplementary resources may remain inactivated unless or until the supplementary resources can be useful. As a result, some aspects may facilitate dynamically allocating configured supplementary resources for communicating data bursts, without tying up resources when the supplementary resources are not to be used.

The set of supplementary resources may be triggered, activated, or deactivated explicitly (for example, using a wakeup signal (WUS), a DCI transmission, a MAC CE, or an RRC message), thereby enabling a network node to allocate configured supplementary resources to accommodate data bursts In some aspects, the set of supplementary resources may be triggered, activated or deactivated implicitly, thereby automatically providing supplementary resources only when the supplementary resources can be used. For example, a set of supplementary resources may be activated for retransmission of a data packet based on transmission of a HARQ negative acknowledgment (NACK) (HARQ-NACK) without waiting for a new period associated with a configured periodic resource. In another example, a set of supplementary resources may be activated based on a communication of a configured resource having a payload of a length that satisfies a payload length condition, thereby automatically providing supplementary resources to facilitate communicating payloads that may be too large for configured periodic resources.

In this way, some aspects may facilitate communication of data burst traffic using a combination of configured periodic resources and supplementary resources. As a result, data burst traffic may be communicated without unnecessary increases in signaling overhead or power consumption, thereby potentially positively impacting device and network performance.

Figure 19:
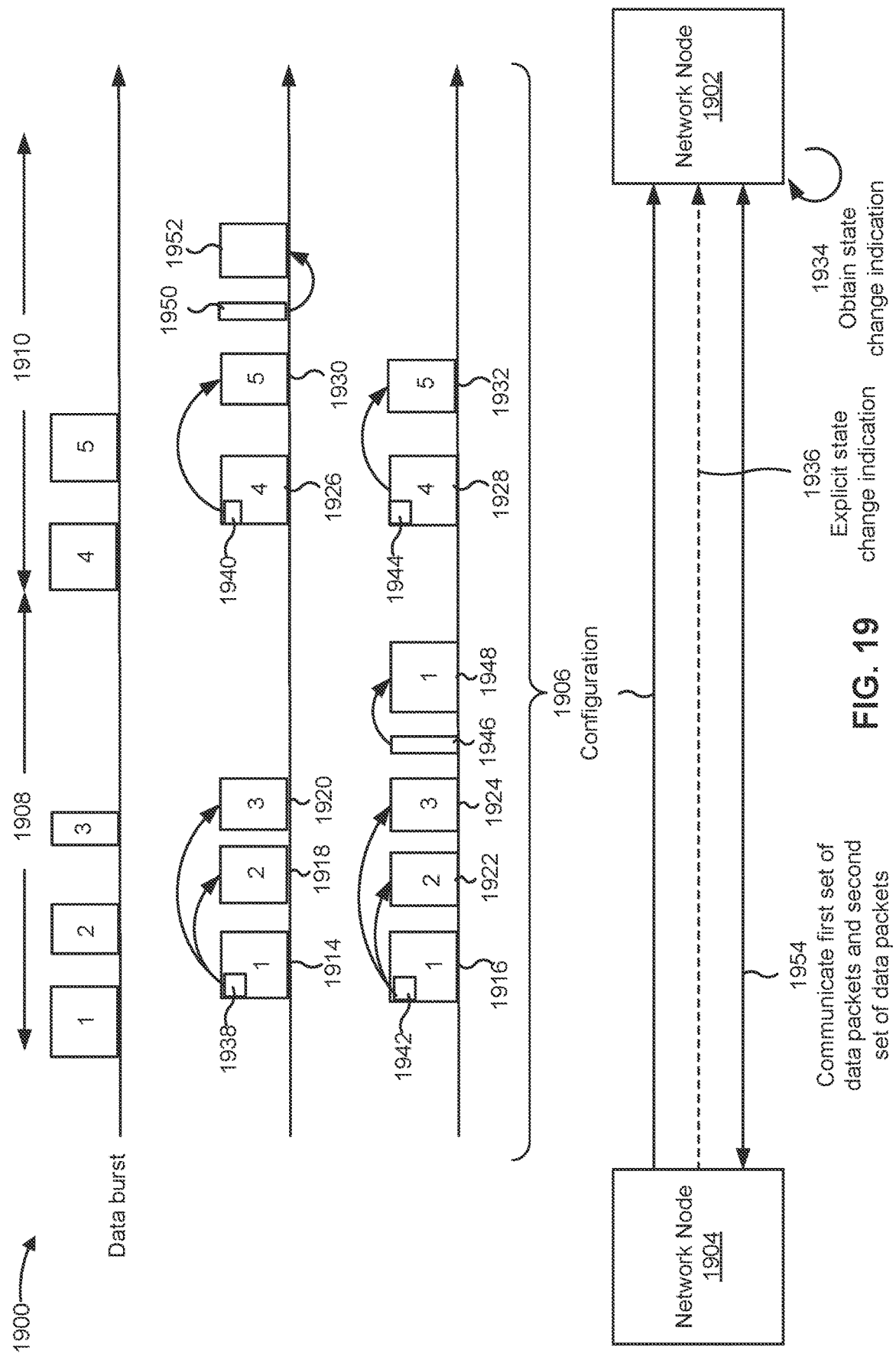
FIG. 19 is a diagram illustrating an example associated with supplementary resources for data bursts.

FIG. 19 is a diagram illustrating an example 1900 associated with supplementary resources for data bursts. As shown in FIG. 19, a network node 1902 and a network node 1904 may communicate with one another. The network node 1902 or the network node 1904 may be, be similar to, include, or be included in, a network entity (for example, the network node 110 depicted in FIGS. 1 and 2 or a disaggregated network component (for example, any one or more of the functions described in connection with FIG. 3)), a UE (for example, the UE 120 depicted in FIGS. 1 and 2), a relay device, or a repeater.

As shown by reference number 1906, the network node 1904 may output, and the network node 1902 may obtain, a configuration. The configuration may be associated with a set of supplementary resources. The set of supplementary resources may be configured by the network node 1904 to be used for communicating (for example, outputting or obtaining) data packets. In some aspects, the supplementary resources may be used for communicating data packets that are part of a data burst in scenarios in which a set of configured periodic resources are insufficient to communicate the data packets. In some aspects, the supplementary resources may be configured as standalone resources that are not associated with configured periodic resources.

For example, as shown, the data burst may include data packets 1, 2, and 3 within a first data burst period 1908, and data packets 4 and 5 within a second data burst period 1910. A set of configured periodic resources may include configured a periodic DL resource 1914 (for example, an SPS resource) or a configured periodic UL resource 1916 (for example, an uplink CG resource). As shown, the configured periodic resources 1914 or 1916 may be used to communicate a first set of data packets (for example, data packet 1). A set of data packets may include one or more data packets. However, as shown, the configured periodic resources 1914 and 1916 may not be sufficient for communicating a second set of data packets (for example, the data packets 2 and 3).

The configuration may configure supplementary resources to be used for communicating the second set of data packets (for example, data packets 2 and 3). For example, as shown, the configuration may include supplementary DL resources 1918 and 1920 that may be used by the network node 1902 to receive data packets 2 and 3, respectively. The configuration may include supplementary UL resources 1922 and 1924 that may be used by the network node 1902 to transmit data packets 2 and 3, respectively. Similarly, for communicating a data burst during the second data burst period 1910, a configured downlink periodic resource 1926 may be used to receive the data packet 4 or a configured uplink periodic resource 1928 may be used to transmit the data packet 4. The configuration may include the supplementary downlink resource 1930 or the supplementary UL resource 1932 for communicating the data packet 5.

In some aspects, the network node 1904 may provide the configuration by transmitting at least one of an RRC message, a DCI transmission, a triggering message, or a MAC CE. In some aspects, the configuration may be provided in one transmission, while, in other aspects, the configuration may be provided using a number of communications. For example, in some aspects, an RRC message may indicate a plurality of optional configurations, each of which may be identified by a respective configuration index of a plurality of configuration indices. The network node 1904 may transmit, and the network node 1902 may receive, a dynamic indication of a configuration index of the plurality of configuration indices. The set of supplementary resources may be associated with a configuration, of the plurality of optional configurations, identified by the configuration index. In some aspects, a first portion of the configuration may be indicated by the RRC message, and a second portion of the configuration may be indicated by a triggering message. For example, in some aspects, at least one of a transmission configuration indication (TCI) or a spatial relation associated with the set of supplementary resources may be indicated by at least one of the triggering message, the DCI transmission, or the MAC CE.

In some aspects, the network node 1902 may obtain the configuration implicitly. For example, in some aspects, the network node 1902 may obtain one or more configuration parameters associated with the configuration. In some aspects, the network node 1902 may implicitly obtain the one or more configuration parameters based on redefining a timing associated with one or more resources of the set of supplementary resources with respect to a transmission of a HARQ-NACK. In some aspects, for example, the network node 1902 may implicitly obtain the one or more configuration parameters based on obtaining an MCS associated with a first transmitted data packet for use in retransmitting the first transmitted data packet.

In some aspects, the network node 1902 may implicitly obtain the one or more configuration parameters based on obtaining at least one of a TCI or a spatial relation associated with the set of supplementary resources. In some aspects, the at least one of the TCI or the spatial relation may be associated with (e.g., indicated for, mapped to) a lowest control resource set (CORESET) ID of a plurality of CORESET IDs. In some aspects, the at least one of the TCI or the spatial relation may be associated with a last communication having a same communication direction as a set of data packets to be communicated.

As shown by reference number 1934, the network node 1904 may obtain a state change indication. In some aspects, the state change indication may indicate a state change associated with a set of supplementary resources. The state change may be associated with an occurrence of a state change event. In some aspects, the state change event may include at least one of a triggering event, an activation event, or a deactivation event.

The network node 1902 may obtain the occurrence of the state change indication explicitly or implicitly. For example, as shown by reference number 1936, the network node 1904 may provide, and the network node 1902 may obtain an explicit state change indication. The explicit state change indication may include at least one of a WUS, a DCI transmission, a MAC CE, or an RRC message. For example, as shown, the network node 1902 may receive the data packet 1 via configured periodic DL resource 1914. A DCI transmission 1938 may be piggy-backed on the periodic DL resource 1914, meaning that the DCI transmission 1938 is transmitted with another communication on the periodic DL resource 1914. The DCI transmission 1938 may indicate (as shown by the arrows extending from the DCI transmission 1938) activation of or triggering of the supplementary DL resource 1918 or the supplementary DL resource 1920 for receiving the data packets 2 and 3. Similarly, a DCI transmission 1940 may indicate activation or triggering of the supplementary DL resource 1930 for receiving the data packet 5. In the uplink, a MAC CE 1942 may be used to indicate activation or triggering of the supplementary UL resources 1922 or 1924. Similarly, a MAC CE 1944 may be used to indicate activation or triggering of the supplementary UL resource 1932. As is also shown, for example, a DCI transmission 1946 may be used to activate, for example, a supplementary uplink resource 1948 for re-transmission of the data packet 1.

In some aspects, the occurrence of the state change event may include an implicit state change indication. For example, in some aspects, the implicit state change indication may include a transmission of a HARQ-NACK. As shown, for example, the network node 1902 may receive a data packet 4 using the configured periodic resource 1926 and may transmit a HARQ-NACK 1950 upon determining a failure to receive the data packet 4. The transmission of the HARQ-NACK 1950 may implicitly indicate an activation of a supplementary downlink resource 1952 that may be used, for example, for a re-transmission of the data packet 4. In some aspects, the state change may include an activation, based on the implicit state change indication, of a downlink resource of the set of supplementary resources. The implicit state change indication may include a transmission of a SR. In some aspects, the implicit state change indication may include transmission of an uplink CG having a payload length that satisfies a payload length condition. The state change may include an activation, based on the implicit state change indication, of an uplink resource of the set of supplementary resources.

As shown by reference number 1954, the network node 1902 and the network node 1904 may communicate a first set of data packets and a second set of data packets. The first set of data packets and the second set of data packets may include data packets associated with a data packet burst associated with a data traffic period. In some aspects, for example, the data packets may include XR data packets. For example, the network node 1902 may communicate a first set of data packets using a set of configured periodic resources and may communicate a second set of data packets of the data packet burst using a set of supplementary resources. The set of supplementary resources may include at least one of an uplink resource, a downlink resource, or a joint downlink/uplink resource.

In some aspects, for example, the network node 1902 may communicate the first set of data packets based on transmitting the first set of data packets using a set of uplink CG resources. The network node 1902 may communicate the first set of data packets based on receiving the first set of data packets via a set of SPS resources. In some aspects, the network node 1902 may communicate the second set of data packets based on re-transmitting a first transmission of a data packet.

Figure 20:
FIG. 20 is a diagram illustrating an example process performed, for example, by an apparatus of a base station or a network function of a disaggregated base station.

FIG. 20 is a diagram illustrating an example process 2000 performed, for example, by an apparatus of a base station or a network function of a disaggregated base station. The process 2000 is an example where the apparatus (for example, an apparatus of the network node 1902, an apparatus of the network node 110 depicted in FIGS. 1 and 2, an apparatus of the UE 120 depicted in FIGS. 1 and 2, and/or any one or more of the functions described in connection with FIG. 3) performs operations associated with supplementary resources for data bursts.

As shown in FIG. 20, in some aspects, the process 2000 may include communicating, using a set of configured periodic resources, a first set of data packets of a data packet burst associated with a data traffic period (block 2010). For example, the apparatus (such as by using communication manager 2208, reception component 2202, or transmission component 2204, depicted in FIG. 22) may communicate, using a set of configured periodic resources, a first set of data packets of a data packet burst associated with a data traffic period, as described, for example, in connection with resources 1914 and 1916 or resources 1926 or 1928 of FIG. 19.

As further shown in FIG. 20, in some aspects, the process 2000 may include communicating, using a set of supplementary resources and associated with a state change corresponding to the set of supplementary resources, a second set of data packets of the data packet burst (block 2020). For example, the apparatus (such as by using communication manager 2208, reception component 2202, or transmission component 2204, depicted in FIG. 22) may communicate, using a set of supplementary resources and associated with a state change corresponding to the set of supplementary resources, a second set of data packets of the data packet burst, as described, for example, in connection with resources 1918, 1920, 1922, 1924, 1930, and 1932 of FIG. 19. A state change indication (sometimes referred to herein as an indication) is described in connection with reference numbers 1934 and 1936.

The process 2000 may include additional aspects, such as any single aspect or any combination of aspects described in connection with the process 2000 or in connection with one or more other processes described elsewhere herein.

In a first additional aspect, communicating the first set of data packets includes transmitting the first set of data packets, and the set of CG resources includes a set of uplink CG resources. In a second additional aspect, alone or in combination with the first aspect, communicating the first set of data packets includes receiving the first set of data packets, and the set of CG resources includes a set of SPS resources. In a third additional aspect, alone or in combination with one or more of the first and second aspects, the state change is associated with an occurrence of a state change event, the state change event including at least one of a triggering event, an activation event, or a deactivation event.

In a fourth additional aspect, alone or in combination with the third aspect, the occurrence of the state change event includes a reception of an explicit state change indication. In a fifth additional aspect, alone or in combination with the fourth aspect, the explicit state change indication includes at least one of a WUS, a DCI transmission, a MAC CE, or an RRC message. In a sixth additional aspect, alone or in combination with one or more of the fourth through fifth aspects, the process 2000 includes receiving the explicit state change indication.

In a seventh additional aspect, alone or in combination with one or more of the third through sixth aspects, the occurrence of the state change event includes an implicit state change indication. In an eighth additional aspect, alone or in combination with the seventh aspect, the implicit state change indication includes a transmission of a HARQ-NACK. In a ninth additional aspect, alone or in combination with one or more of the seventh or eighth aspects, the state change includes an activation, based on the implicit state change indication, of a downlink resource of the set of supplementary resources.

In a tenth additional aspect, alone or in combination with one or more of the seventh through ninth aspects, the implicit state change indication includes a transmission of an SR. In an eleventh additional aspect, alone or in combination with one or more of the seventh through tenth aspects, the implicit state change indication includes transmission of an uplink CG having a payload length that satisfies a payload length condition. In a twelfth additional aspect, alone or in combination with one or more of the seventh through eleventh aspects, the state change includes an activation, based on the implicit state change indication, of an uplink resource of the set of supplementary resources.

In a thirteenth additional aspect, alone or in combination with one or more of the first through twelfth aspects, the set of supplementary resources include at least one of an uplink resource, a downlink resource, or a joint downlink/uplink resource. In a fourteenth additional aspect, alone or in combination with one or more of the first through thirteenth aspects, communicating the second set of data packets includes transmitting a first transmission of a data packet of the second set of data packets. In a fifteenth additional aspect, alone or in combination with one or more of the first through fourteenth aspects, communicating the second set of data packets includes re-transmitting a first transmission of a data packet of the second set of data packets.

In a sixteenth additional aspect, alone or in combination with one or more of the first through fifteenth aspects, the process 2000 includes obtaining a configuration associated with the set of supplementary resources. In a seventeenth additional aspect, alone or in combination with the sixteenth aspect, obtaining the configuration includes receiving at least one of an RRC message, a DCI transmission, a triggering message, or a MAC CE. In an eighteenth additional aspect, alone or in combination with the seventeenth aspect, the RRC message indicates a plurality of optional configurations, where each optional configuration of the plurality of optional configurations is identified by a respective configuration index of a plurality of configuration indices. In a nineteenth additional aspect, alone or in combination with the eighteenth aspect, the process 2000 includes receiving a dynamic indication of a configuration index of the plurality of configuration indices, where the set of supplementary resources is associated with a configuration, of the plurality of optional configurations, identified by the configuration index.

In a twentieth additional aspect, alone or in combination with one or more of the seventeenth through nineteenth aspects, a first portion of the configuration is indicated by the RRC message, and a second portion of the configuration is indicated by the triggering message. In a twenty-first additional aspect, alone or in combination with one or more of the seventeenth through twentieth aspects, at least one of a TCI or a spatial relation associated with the set of supplementary resources is indicated by at least one of the triggering message, the DCI transmission, or the MAC CE.

In a twenty-second additional aspect, alone or in combination with one or more of the sixteenth through twenty-first aspects, obtaining the configuration includes implicitly obtaining one or more configuration parameters associated with the configuration. In a twenty-third additional aspect, alone or in combination with the twenty-second aspect, implicitly obtaining the one or more configuration parameters includes redefining a timing associated with one or more resources of the set of supplementary resources with respect to a transmission of a HARQ-NACK. In a twenty-fourth additional aspect, alone or in combination with one or more of the twenty-second or twenty-third aspects, implicitly obtaining the one or more configuration parameters includes obtaining an MCS associated with a first transmitted data packet for use in retransmitting the first transmitted data packet.

In a twenty-fifth additional aspect, alone or in combination with one or more of the twenty-second through twenty-fourth aspects, implicitly obtaining the one or more configuration parameters includes obtaining at least one of a TCI or a spatial relation associated with the set of supplementary resources. In a twenty-sixth additional aspect, alone or in combination with the twenty-fifth aspect, the at least one of the TCI or the spatial relation are associated with a lowest CORESET ID of a plurality of CORESET IDs. In a twenty-seventh additional aspect, alone or in combination with one or more of the twenty-fifth through twenty-sixth aspects, the at least one of the TCI or the spatial relation are associated with a last communication having a same communication direction as the second set of data packets. In a twenty-eighth additional aspect, alone or in combination with one or more of the first through twenty-seventh aspects, the data burst includes a plurality of XR data packets.

Although FIG. 20 shows example blocks of the process 2000, in some aspects, the process 2000 may include additional blocks, fewer blocks, different blocks, or differently arranged blocks than those depicted in FIG. 20. Additionally, or alternatively, two or more of the blocks of the process 2000 may be performed in parallel.

Figure 21:
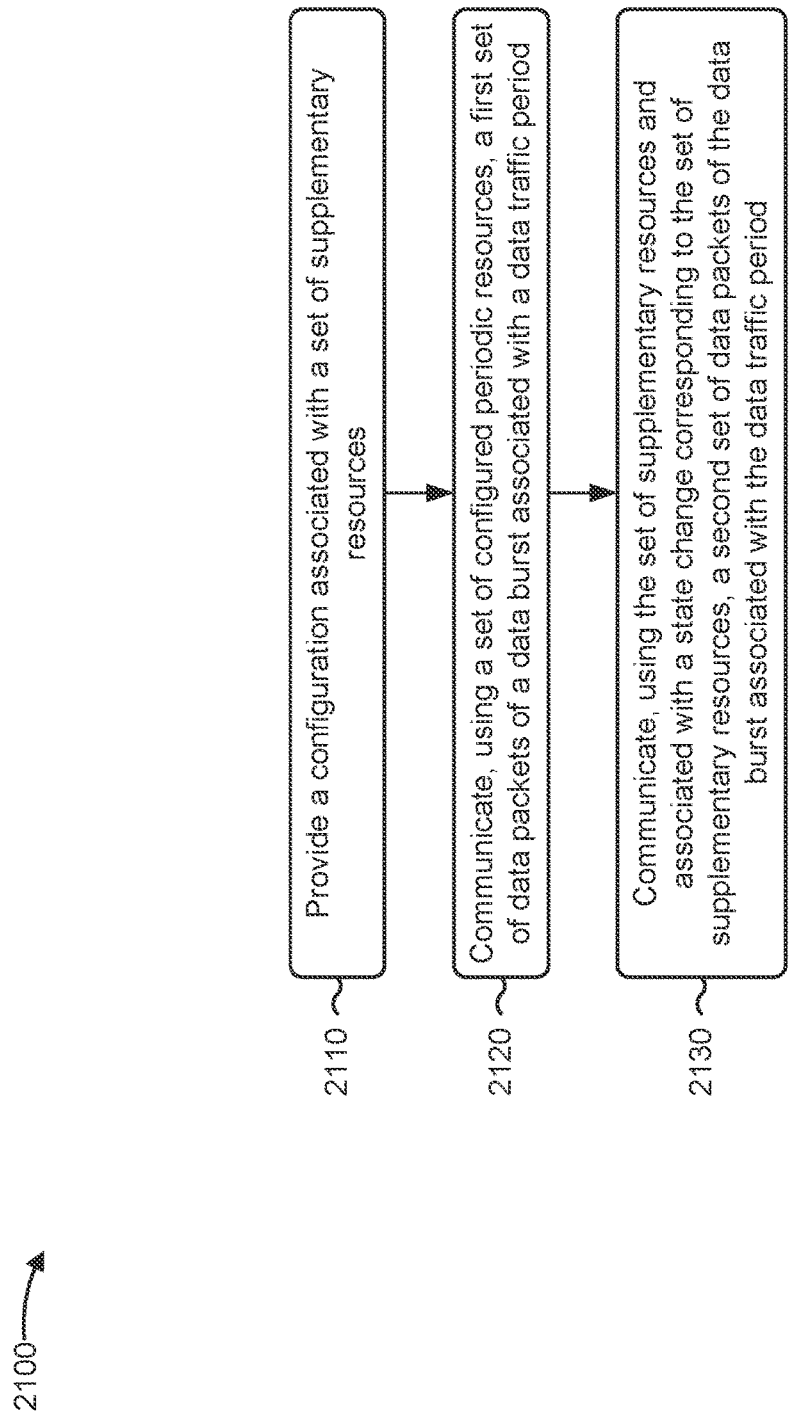
FIG. 21 is a diagram illustrating an example process performed, for example, by an apparatus of a network node.

FIG. 21 is a diagram illustrating an example process 2100 performed, for example, by an apparatus of a network node. The process 2100 is an example where the apparatus of the network node (for example, an apparatus of the network node 1904, an apparatus of the network node 110 depicted in FIGS. 1 and 2, an apparatus of the UE 120 depicted in FIGS. 1 and 2, and/or any one or more of the functions described in connection with FIG. 3) performs operations associated with supplementary resources for data bursts.

As shown in FIG. 21, in some aspects, the process 2100 may include providing a configuration associated with a set of supplementary resources (block 2110). For example, the network node (such as by using communication manager 2308 or transmission component 2304, depicted in FIG. 23) may provide a configuration associated with a set of supplementary resources.

As further shown in FIG. 21, in some aspects, the process 2100 may include communicating, using a set of configured periodic resources, a first set of data packets of a data burst associated with a data traffic period (block 2120). For example, the network node (such as by using communication manager 2308, reception component 2302, or transmission component 2304, depicted in FIG. 23) may communicate, using a set of configured periodic resources, a first set of data packets of a data burst associated with a data traffic period.

As further shown in FIG. 21, in some aspects, the process 2100 may include communicating, using the set of supplementary resources and associated with a state change corresponding to the set of supplementary resources, a second set of data packets of the data burst associated with the data traffic period (block 2130). For example, the network node (such as by using communication manager 2308, reception component 2302, or transmission component 2304, depicted in FIG. 23) may communicate, using the set of supplementary resources and associated with a state change corresponding to the set of supplementary resources, a second set of data packets of the data burst associated with the data traffic period.

The process 2100 may include additional aspects, such as any single aspect or any combination of aspects described in connection with the process 2100 or in connection with one or more other processes described elsewhere herein.

In a first additional aspect, communicating the first set of data packets includes receiving the first set of data packets, and the set of CG resources includes a set of uplink CG resources. In a second additional aspect, alone or in combination with the first aspect, communicating the first set of data packets includes transmitting the first set of data packets, and the set of CG resources includes a set of SPS resources. In a third additional aspect, alone or in combination with one or more of the first and second aspects, the state change is associated with an occurrence of a state change event, the state change event including at least one of a triggering event, an activation event, or a deactivation event. In a fourth additional aspect, alone or in combination with the third aspect, the occurrence of the state change event includes a reception of an explicit state change indication.

In a fifth additional aspect, alone or in combination with the fourth aspect, the explicit state change indication includes at least one of a WUS, a DCI transmission, a MAC CE, or an RRC message. In a sixth additional aspect, alone or in combination with one or more of the fourth or fifth aspects, the process 2100 includes transmitting the explicit state change indication. In a seventh additional aspect, alone or in combination with one or more of the third through sixth aspects, the occurrence of the state change event includes an implicit state change indication. In an eighth additional aspect, alone or in combination with the seventh aspect, the implicit state change indication includes a transmission of a HARQ-NACK. In a ninth additional aspect, alone or in combination with one or more of the seventh or eighth aspects, the state change includes an activation, based on the implicit state change indication, of a downlink resource of the set of supplementary resources.

In a tenth additional aspect, alone or in combination with one or more of the seventh through ninth aspects, the implicit state change indication includes a transmission of an SR. In an eleventh additional aspect, alone or in combination with one or more of the seventh through tenth aspects, the implicit state change indication includes transmission of an uplink CG having a payload length that satisfies a payload length condition. In a twelfth additional aspect, alone or in combination with one or more of the seventh through eleventh aspects, the state change includes an activation, based on the implicit state change indication, of an uplink resource of the set of supplementary resources.

In a thirteenth additional aspect, alone or in combination with one or more of the first through twelfth aspects, the set of supplementary resources include at least one of an uplink resource, a downlink resource, or a joint downlink/uplink resource. In a fourteenth additional aspect, alone or in combination with one or more of the first through thirteenth aspects, communicating the second set of data packets includes receiving a first transmission of a data packet of the second set of data packets. In a fifteenth additional aspect, alone or in combination with the fourteenth aspect, communicating the second set of data packets includes receiving a re-transmission the first transmission of the data packet of the second set of data packets.

In a sixteenth additional aspect, alone or in combination with one or more of the first through fifteenth aspects, process 2100 includes providing a configuration associated with the set of supplementary resources. In a seventeenth additional aspect, alone or in combination with the sixteenth aspect, providing the configuration includes transmitting at least one of an RRC message, a DCI transmission, a triggering message, or a MAC CE. In an eighteenth additional aspect, alone or in combination with the seventeenth aspect, the RRC message indicates a plurality of optional configurations, where each optional configuration of the plurality of optional configurations is identified by a respective configuration index of a plurality of configuration indices. In a nineteenth additional aspect, alone or in combination with the eighteenth aspect, the process 2100 includes transmitting a dynamic indication of a configuration index of the plurality of configuration indices, where the set of supplementary resources is associated with a configuration, of the plurality of optional configurations, identified by the configuration index.

In a twentieth additional aspect, alone or in combination with one or more of the seventeenth through nineteenth aspects, a first portion of the configuration is indicated by the RRC message, and a second portion of the configuration is indicated by the triggering message. In a twenty-first additional aspect, alone or in combination with one or more of the seventeenth through twentieth aspects, at least one of a TCI or a spatial relation associated with the set of supplementary resources is indicated by at least one of the triggering message, the DCI transmission, or the MAC CE. In a twenty-second additional aspect, alone or in combination with one or more of the first through twenty-first aspects, the data burst includes a plurality of XR data packets.

Although FIG. 21 shows example blocks of the process 2100, in some aspects, the process 2100 may include additional blocks, fewer blocks, different blocks, or differently arranged blocks than those depicted in FIG. 21. Additionally, or alternatively, two or more of the blocks of the process 2100 may be performed in parallel.

It should be noted that any one or more features, described with regard to one or more of FIG. 7-18 or 22-23, can be implemented as part of any one or more examples described with regard to FIGS. 19-21.

Figure 22:
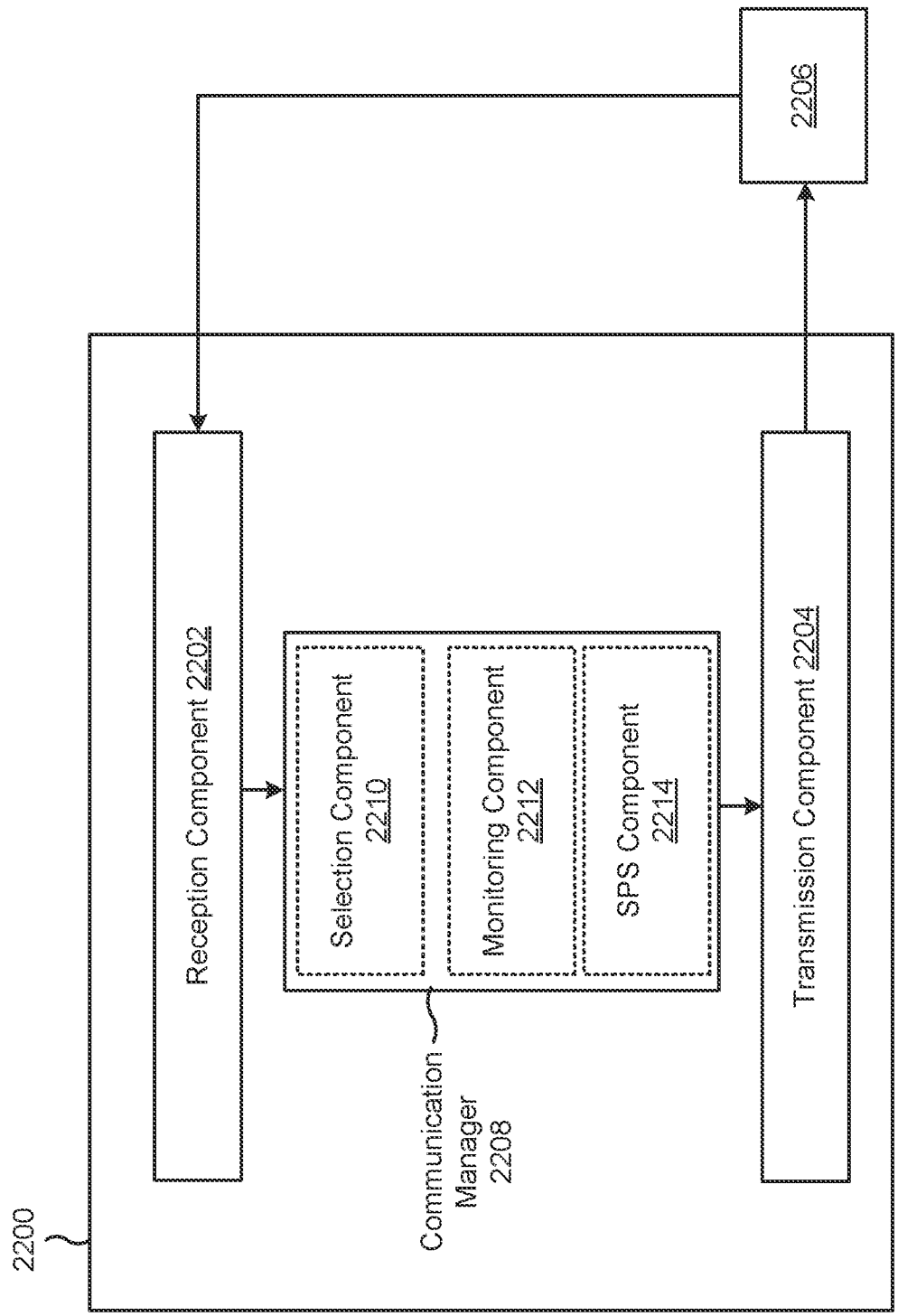
FIG. 22 is a diagram of an example apparatus for wireless communication.

FIG. 22 is a diagram of an example apparatus 2200 for wireless communication. The apparatus 2200 may be a UE (e.g., a UE 120, UE 720), or a UE may include the apparatus 2200. In some aspects, the apparatus 2200 includes a reception component 2202 and a transmission component 2204, which may be in communication with one another (for example, via one or more buses and/or one or more other components). As shown, the apparatus 2200 may communicate with another apparatus 2206 (such as a UE, a base station, or another wireless communication device) using the reception component 2202 and the transmission component 2204. As further shown, the apparatus 2200 may include the communication manager 2208. The communication manager 2208 may control and/or otherwise manage one or more operations of the reception component 2202 and/or the transmission component 2204. In some aspects, the communication manager 2208 may include one or more antennas, a modem, a controller/processor, a memory, or a combination thereof, of the UE described in connection with FIG. 2. The communication manager 2208 may be, or be similar to, the communication manager 150 depicted in FIGS. 1 and 2. For example, in some aspects, the communication manager 2208 may be configured to perform one or more of the functions described as being performed by the communication manager 220. In some aspects, the communication manager 2208 may include the reception component 2202 and/or the transmission component 2204. The communication manager 2208 may include a selection component 2210, a monitoring component 2212, and/or an SPS component 2214, among other examples.

In some aspects, the apparatus 2200 may be configured to perform one or more operations described herein in connection with FIGS. 1-21. Additionally, or alternatively, the apparatus 2200 may be configured to perform one or more processes described herein, such as process 1100 of FIG. 11, process 1200 of FIG. 12, process 1700 of FIG. 17, process 2000 of FIG. 20, or process 2100 of FIG. 21. In some aspects, the apparatus 2200 and/or one or more components shown in FIG. 22 may include one or more components of the UE 120 described in connection with FIG. 2. Additionally, or alternatively, one or more components shown in FIG. 22 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2202 may receive communications, such as reference signals, control information, data communications, or a combination thereof, from the apparatus 2206. The reception component 2202 may provide received communications to one or more other components of the apparatus 2200. In some aspects, the reception component 2202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2200. In some aspects, the reception component 2202 may include one or more antennas, a modem, a demodulator, a MIMO detector, a receive processor, a controller/processor, a memory, or a combination thereof, of the UE described in connection with FIG. 2.

The transmission component 2204 may transmit communications, such as reference signals, control information, data communications, or a combination thereof, to the apparatus 2206. In some aspects, one or more other components of the apparatus 2200 may generate communications and may provide the generated communications to the transmission component 2204 for transmission to the apparatus 2206. In some aspects, the transmission component 2204 may perform signal processing on the generated communications (such as filtering, amplification, modulation, digital-to-analog conversion, multiplexing, interleaving, mapping, or encoding, among other examples), and may transmit the processed signals to the apparatus 2206. In some aspects, the transmission component 2204 may include one or more antennas, a modem, a modulator, a transmit MIMO processor, a transmit processor, a controller/processor, a memory, or a combination thereof, of the UE described in connection with FIG. 2. In some aspects, the transmission component 2204 may be co-located with the reception component 2202 in a transceiver.

In some aspects, the reception component 2202 may receive a first packet and a second packet for transmission during a period for a periodic application. The transmission component 2204 may transmit the first packet and the second packet in a combination of a dynamic grant and a CG occasion. The selection component 2210 may select the dynamic grant or the CG occasion for the first packet based at least in part on a time duration between arrival of the first packet and the CG occasion.

The reception component 2202 may receive a waveform sequence, DCI, or a MAC CE that indicates a next dynamic grant. The monitoring component 2212 may skip transmitting a scheduling request and monitoring for DCI for the next dynamic grant.

The reception component 2202 may receive a packet in the next dynamic grant. The reception component 2202 may receive a waveform sequence, DCI, or a MAC CE that indicates that a next CG occasion is to be skipped. The monitoring component 2212 may skip monitoring in the next CG occasion.

In some aspects, the reception component 2202 may receive DCI that indicates a dynamic grant. The reception component 2202 may receive a first packet and a second packet for a periodic application in a combination of the dynamic grant and an SPS occasion during a period for the periodic application.

The monitoring component 2212 may monitor for the DCI within a time window having a size that is based at least in part on dynamic grants that can be received before and after an SPS occasion. The monitoring component 2212 may decrease a monitoring periodicity within the time window when not receiving an SPS occasion. The monitoring component 2212 may increase the monitoring periodicity outside the time window.

The reception component 2202 may receive a waveform sequence, DCI, or a MAC CE, that indicates that a next SPS occasion is to be skipped. The monitoring component 2212 may skip monitoring in the next SPS occasion.

The reception component 2202 may receive a waveform sequence, DCI, or a MAC CE that indicates a change in an MCS or a change in a length of a next SPS occasion. The monitoring component 2212 may adjust how the UE monitors for the next SPS occasion based at least in part on the change in the MCS or the change in the length of the next SPS occasion.

The reception component 2202 may receive configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication. The reception component 2202 or the SPS component 2214 may receive an indication activating or deactivating at least one SPS occasion, of the first SPS configuration or the second SPS configuration. The reception component 2202 or the SPS component 2214 may perform the communication in accordance with the indication.

The SPS component 2214 may deactivate the second SPS configuration after a deactivation time interval has elapsed without the UE communicating on the one or more second SPS occasions.

The communication manager 2208, the reception component 2202, or the transmission component 2204 may communicate, using a set of supplementary resources and associated with a state change corresponding to the set of supplementary resources, a second set of data packets of the data packet burst. The reception component 2202 may receive the explicit state change indication. The reception component 2202 may obtain a configuration associated with the set of supplementary resources. The reception component 2202 may receive a dynamic indication of a configuration index of the plurality of configuration indices, where the set of supplementary resources is associated with a configuration, of the plurality of optional configurations, identified by the configuration index.

The communication manager 2208 or the transmission component 2204 may provide a configuration associated with a set of supplementary resources. The communication manager 2208, the reception component 2202, or the transmission component 2204 may communicate, using a set of configured periodic resources, a first set of data packets of a data burst associated with a data traffic period. The communication manager 2208, the reception component 2202, or the transmission component 2204 may communicate, using the set of supplementary resources and associated with a state change corresponding to the set of supplementary resources, a second set of data packets of the data burst associated with the data traffic period. The transmission component 2204 may transmit the explicit state change indication. The transmission component 2204 may provide a configuration associated with the set of supplementary resources. The transmission component 2204 may transmit a dynamic indication of a configuration index of the plurality of configuration indices, where the set of supplementary resources is associated with a configuration, of the plurality of optional configurations, identified by the configuration index.

The number and arrangement of components shown in FIG. 22 are provided as an example. In practice, there may be additional components, fewer components, different components, or differently arranged components than those shown in FIG. 22. Furthermore, two or more components shown in FIG. 22 may be implemented within a single component, or a single component shown in FIG. 22 may be implemented as multiple, distributed components. Additionally, or alternatively, a set of (one or more) components shown in FIG. 22 may perform one or more functions described as being performed by another set of components shown in FIG. 22.

Figure 23:
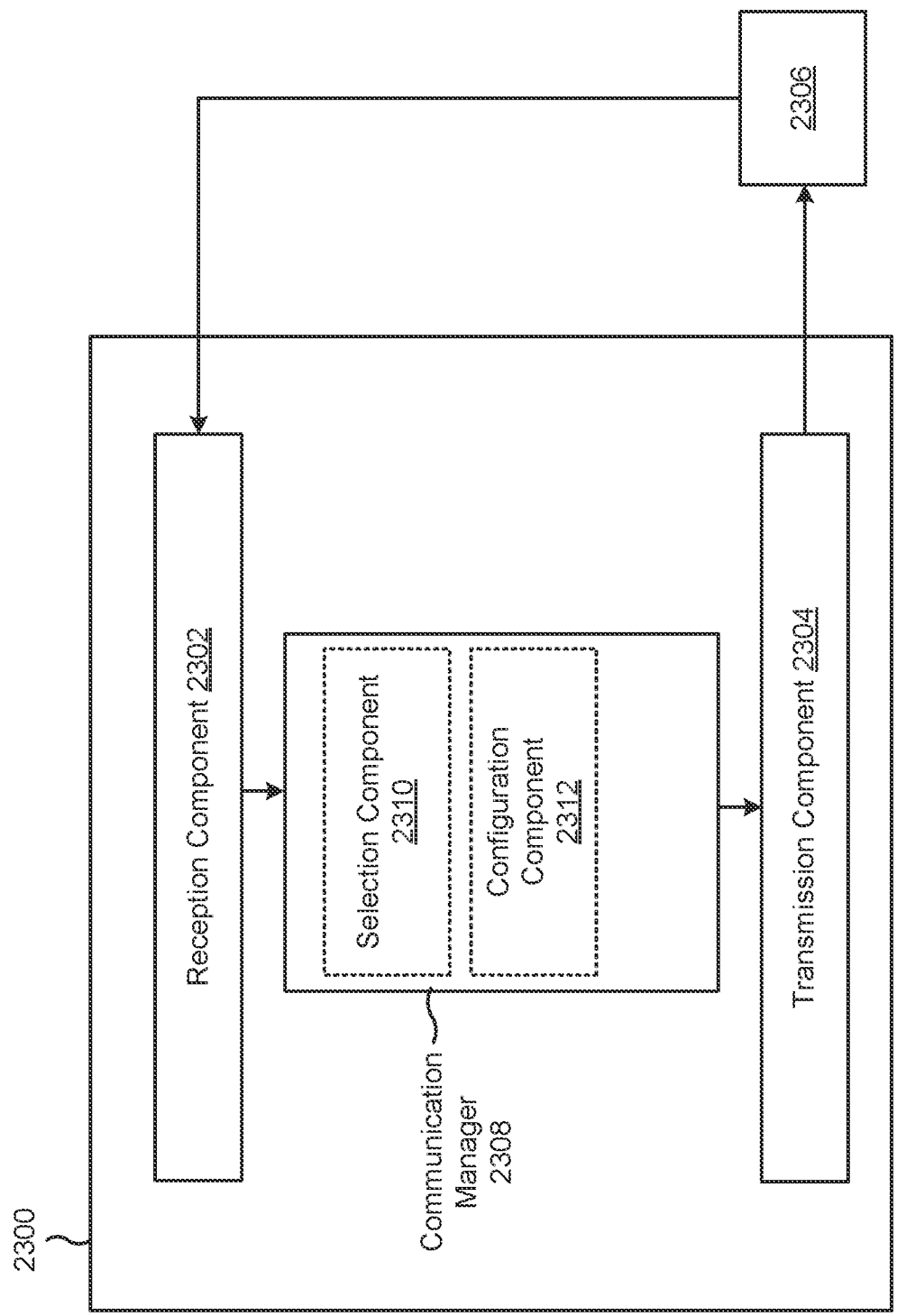
FIG. 23 is a diagram of an example apparatus for wireless communication.

FIG. 23 is a diagram of an example apparatus 2300 for wireless communication. The apparatus 2300 may be a network entity (e.g., network node 110, network entity 710), or a network entity may include the apparatus 2300. In some aspects, the apparatus 2300 includes a reception component 2302 and a transmission component 2304, which may be in communication with one another (for example, via one or more buses and/or one or more other components). As shown, the apparatus 2300 may communicate with another apparatus 2306 (such as a UE, a base station, or another wireless communication device) using the reception component 2302 and the transmission component 2304. As further shown, the apparatus 2300 may include the communication manager 2308. The communication manager 2308 may control and/or otherwise manage one or more operations of the reception component 2302 and/or the transmission component 2304. In some aspects, the communication manager 2308 may include one or more antennas, a modem, a controller/processor, a memory, or a combination thereof, of the network entity described in connection with FIG. 2. The communication manager 2308 may be, or be similar to, the communication manager 150 depicted in FIGS. 1 and 2. For example, in some aspects, the communication manager 2308 may be configured to perform one or more of the functions described as being performed by the communication manager 230. In some aspects, the communication manager 2308 may include the reception component 2302 and/or the transmission component 2304. The communication manager 2308 may include a selection component 2310 or a configuration component 2312, among other examples.

In some aspects, the apparatus 2300 may be configured to perform one or more operations described herein in connection with FIGS. 1-21. Additionally, or alternatively, the apparatus 2300 may be configured to perform one or more processes described herein, such as process 1300 of FIG. 13, process 1800 of FIG. 18, process 2000 of FIG. 20, or process 2100 of FIG. 21. In some aspects, the apparatus 2300 and/or one or more components shown in FIG. 23 may include one or more components of the network entity described in connection with FIG. 2. Additionally, or alternatively, one or more components shown in FIG. 23 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2302 may receive communications, such as reference signals, control information, data communications, or a combination thereof, from the apparatus 2306. The reception component 2302 may provide received communications to one or more other components of the apparatus 2300. In some aspects, the reception component 2302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2300. In some aspects, the reception component 2302 may include one or more antennas, a modem, a demodulator, a MIMO detector, a receive processor, a controller/processor, a memory, or a combination thereof, of the network entity described in connection with FIG. 2.

The transmission component 2304 may transmit communications, such as reference signals, control information, data communications, or a combination thereof, to the apparatus 2306. In some aspects, one or more other components of the apparatus 2300 may generate communications and may provide the generated communications to the transmission component 2304 for transmission to the apparatus 2306. In some aspects, the transmission component 2304 may perform signal processing on the generated communications (such as filtering, amplification, modulation, digital-to-analog conversion, multiplexing, interleaving, mapping, or encoding, among other examples), and may transmit the processed signals to the apparatus 2306. In some aspects, the transmission component 2304 may include one or more antennas, a modem, a modulator, a transmit MIMO processor, a transmit processor, a controller/processor, a memory, or a combination thereof, of the network entity described in connection with FIG. 2. In some aspects, the transmission component 2304 may be co-located with the reception component 2302 in a transceiver.

The reception component 2302 may receive a first packet and a second packet for transmission during a period for a periodic application. The transmission component 2304 may transmit the first packet and the second packet in a combination of a dynamic grant and an SPS occasion. The selection component 2310 may select the dynamic grant or the SPS occasion for the first packet based at least in part on a time duration between arrival of the first packet and the SPS occasion.

The transmission component 2304 may transmit a waveform sequence, DCI, or a MAC CE that indicates that a next SPS occasion is to be skipped in response to no packet being received for transmission in the next SPS occasion. The transmission component 2304 may transmit a waveform, DCI, or a MAC CE that indicates a next dynamic grant or that indicates a next SPS occasion is to be skipped. The transmission component 2304 may transmit a waveform sequence, DCI, or a MAC CE that indicates a change in an MCS or a length of a next SPS occasion.

The transmission component 2304 or the configuration component 2312 may transmit configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication. The transmission component 2304 may transmit an indication activating or deactivating at least one SPS occasion, of the first SPS configuration or the second SPS configuration.

The number and arrangement of components shown in FIG. 23 are provided as an example. In practice, there may be additional components, fewer components, different components, or differently arranged components than those shown in FIG. 23. Furthermore, two or more components shown in FIG. 23 may be implemented within a single component, or a single component shown in FIG. 23 may be implemented as multiple, distributed components. Additionally, or alternatively, a set of (one or more) components shown in FIG. 23 may perform one or more functions described as being performed by another set of components shown in FIG. 23.

The following provides an overview of some Aspects of the present disclosure:

Aspect 1: A method of wireless communication performed by a user equipment (UE), comprising: receiving configuration information indicating a first semi-persistent scheduling configuration and a second configuration, wherein one or more first periodic resources defined by the first configuration and one or more second periodic resources defined by the second configuration are within a time interval associated with a traffic burst of a communication; obtaining an indication activating or deactivating at least one periodic resource, of the first periodic resource or the second periodic resource; and performing the communication in accordance with the indication.

Aspect 2: The method of Aspect 1, wherein a periodic resource, of the one or more second periodic resources, occurs before the one or more first periodic resources and within the time interval, or after the one or more first periodic resources and within the time interval.

Aspect 3: The method of any of Aspects 1-2, wherein the indication comprises: a first indication associated with the first configuration, and a second indication associated with the second configuration.

Aspect 4: The method of any of Aspects 1-3, further comprising: deactivating the one or more second periodic resources of the second configuration after a deactivation time interval has elapsed without the UE communicating on the one or more second periodic resources.

Aspect 5: The method of any of Aspects 1-4, wherein hybrid automatic repeat request (HARQ) process identifiers are assigned separately for the first configuration and the second configuration.

Aspect 6: The method of any of Aspects 1-5, wherein the indication activates the at least one periodic resource, and wherein the indication indicates a hybrid automatic repeat request (HARQ) process identifier for the at least one periodic resource.

Aspect 7: The method of any of Aspects 1-6, wherein hybrid automatic repeat request (HARQ) process identifiers for the first configuration or the second configuration are selected from a pool of HARQ process identifiers that are shared across the first configuration and the second configuration.

Aspect 8: The method of any of Aspects 1-7, wherein the indication is based at least in part on a sequence used to generate a demodulation reference signal.

Aspect 9: The method of any of Aspects 1-8, wherein the indication is provided via downlink control information (DCI).

Aspect 10: The method of Aspect 9, wherein the indication comprises a flag of the DCI.

Aspect 11: The method of Aspect 9, wherein the DCI is transmitted on a periodic resource associated with the first configuration or the second configuration.

Aspect 12: The method of any of Aspects 1-11, wherein the indication includes multiple multiplexed DCI messages.

Aspect 13: The method of any of Aspects 1-8, wherein the indication is provided via a medium access control (MAC) control element (MAC-CE).

Aspect 14: The method of any of Aspects 1-13, wherein the time interval associated with the traffic burst of the communication is based at least in part on an expected deviation of an actual arrival time of a packet relative to a scheduled arrival time of the packet.

Aspect 15: The method of any of Aspects 1-14, wherein a periodicity of the first configuration or the second configuration is based at least in part on a periodicity of the communication.

Aspect 16: The method of Aspect 15, wherein the periodicity of the communication is based at least in part on a framerate of an extended reality application.

Aspect 17: The method of any of Aspects 1-16, wherein the first configuration and the second configuration are associated with a same traffic flow.

Aspect 18: The method of any of Aspects 1-17, wherein the first configuration and the second configuration are associated with an extended reality traffic flow.

Aspect 19: The method of any of Aspects 1-18, wherein obtaining the indication further comprises receiving the indication.

Aspect 20: The method of any of Aspects 1-19, wherein the indication is an implicit indication.

Aspect 21: A method of wireless communication performed by a network node, comprising: transmitting configuration information indicating a first configuration and a second configuration, wherein one or more first periodic resources defined by the first configuration and one or more second periodic resources defined by the second configuration are within a time interval associated with a traffic burst of a communication; and transmitting an indication activating or deactivating at least one periodic resource, of the first configuration or the second configuration.

Aspect 22: The method of Aspect 21, wherein a periodic resource, of the one or more second periodic resources, occurs before the one or more first periodic resources and within the time interval, or after the one or more first periodic resources and within the time interval.

Aspect 23: The method of any of Aspects 21-22, further comprising: deactivating the one or more second periodic resources of the second configuration after a deactivation time interval has elapsed without communicating on the one or more second periodic resources.

Aspect 24: The method of any of Aspects 21-23, wherein hybrid automatic repeat request (HARQ) process identifiers are assigned separately for the first configuration and the second configuration.

Aspect 25: The method of any of Aspects 21-24, wherein the indication activates the at least one periodic resource, and wherein the indication indicates a hybrid automatic repeat request (HARQ) process identifier for the at least one periodic resource.

Aspect 26: The method of any of Aspects 21-25, wherein hybrid automatic repeat request (HARQ) process identifiers for the first configuration or the second configuration are selected from a pool of HARQ process identifiers that are shared across the first configuration and the second configuration.

Aspect 27: The method of any of Aspects 21-26, wherein hybrid automatic repeat request (HARQ) process identifiers for the first configuration or the second configuration are selected from more than 8 possible HARQ process identifiers.

Aspect 28: The method of any of Aspects 21-27, wherein the indication is based at least in part on a sequence used to generate a demodulation reference signal.

Aspect 29: The method of any of Aspects 21-28, wherein the time interval associated with the traffic burst of the communication is based at least in part on an expected deviation of an actual arrival time of a packet relative to a scheduled arrival time of the packet.

Aspect 30: The method of any of Aspects 21-29, wherein a periodicity of the first configuration or the second configuration is based at least in part on a periodicity of the communication.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive configuration information indicating a first semi-persistent scheduling (SPS) configuration and a second SPS configuration, wherein:
         one or more first periodic resources defined by the first SPS configuration and one or more second periodic resources defined by the second SPS configuration are within a time interval associated with a traffic burst of a communication, and
         the first SPS configuration and the second SPS configuration include variable SPS parameters;
      obtain an indication that activates or deactivates at least one periodic resource, of the one or more first periodic resources or the one or more second periodic resources; and
      perform the communication in accordance with the indication.

2. The UE of claim 1, wherein a periodic resource, of the one or more second periodic resources, occurs before the one or more first periodic resources and within the time interval, or after the one or more first periodic resources and within the time interval.

3. The UE of claim 1, wherein the indication comprises:
   a first indication associated with the first SPS configuration, and
   a second indication associated with the second SPS configuration.

4. The UE of claim 1, wherein the one or more processors are further configured to:
   deactivate the one or more second periodic resources of the second SPS configuration after a deactivation time interval has elapsed without the UE communicating on the one or more second periodic resources.

5. The UE of claim 1, wherein hybrid automatic repeat request (HARQ) process identifiers are assigned separately for the first SPS configuration and the second SPS configuration.

6. The UE of claim 1, wherein the indication activates the at least one periodic resource, and wherein the indication indicates a hybrid automatic repeat request (HARQ) process identifier for the at least one periodic resource.

7. The UE of claim 1, wherein hybrid automatic repeat request (HARQ) process identifiers for the first SPS configuration or the second SPS configuration are selected from a pool of HARQ process identifiers that are shared across the first SPS configuration and the second SPS configuration.

8. The UE of claim 1, wherein the indication is based at least in part on a sequence used to generate a demodulation reference signal.

9. The UE of claim 1, wherein the indication is via downlink control information (DCI).

10. The UE of claim 9, wherein the indication comprises a flag of the DCI.

11. The UE of claim 9, wherein the DCI is on a periodic resource associated with the first SPS configuration or the second SPS configuration.

12. The UE of claim 1, wherein the indication includes multiple multiplexed DCI messages.

13. The UE of claim 1, wherein the time interval associated with the traffic burst of the communication is based at least in part on an expected deviation of an actual arrival time of a packet relative to a scheduled arrival time of the packet.

14. The UE of claim 1, wherein a periodicity of the first SPS configuration or the second SPS configuration is based at least in part on a periodicity of the communication.

15. The UE of claim 1, wherein the first SPS configuration and the second SPS configuration are configured based at least in part on one or more parameters of a traffic flow that includes the communication.

16. The UE of claim 1, wherein the one or more processors, to obtain the indication, are configured to receive the indication.

17. The UE of claim 1, wherein the indication is an implicit indication.

18. A network node for wireless communication, comprising:
one or more memories; and
one or more processors, coupled to the one or more memories, configured to:
  transmit configuration information indicating a first semi-persistent scheduling (SPS) configuration and a second SPS configuration, wherein:
    one or more first periodic resources defined by the first SPS configuration and one or more second periodic resources defined by the second SPS configuration are within a time interval associated with a traffic burst of a communication, and
    the first SPS configuration and the second SPS configuration include variable SPS parameters; and
  transmit an indication that activates or deactivates at least one periodic resource, of the one or more first periodic resources or the one or more second periodic resources.

19. The network node of claim 18, wherein a periodic resource, of the one or more second periodic resources, occurs before the one or more first periodic resources and within the time interval, or after the one or more first periodic resources and within the time interval.

20. The network node of claim 18, wherein the one or more processors are further configured to:
  deactivate the one or more second periodic resources of the second SPS configuration after a deactivation time interval has elapsed without communicating on the one or more second periodic resources.

21. The network node of claim 18, wherein hybrid automatic repeat request (HARQ) process identifiers are assigned separately for the first SPS configuration and the second SPS configuration.

22. The network node of claim 18, wherein the indication activates the at least one periodic resource, and wherein the indication indicates a hybrid automatic repeat request (HARQ) process identifier for the at least one periodic resource.

23. The network node of claim 18, wherein hybrid automatic repeat request (HARQ) process identifiers for the first SPS configuration or the second SPS configuration are selected from a pool of HARQ process identifiers that are shared across the first SPS configuration and the second SPS configuration.

24. The network node of claim 18, wherein hybrid automatic repeat request (HARQ) process identifiers for the first SPS configuration or the second SPS configuration are selected from more than 8 possible HARQ process identifiers.

25. A method of wireless communication performed by a user equipment (UE), comprising:
receiving configuration information indicating a first semi-persistent scheduling (SPS) configuration and a second SPS configuration, wherein:
  one or more first periodic resources defined by the first SPS configuration and one or more second periodic resources defined by the second SPS configuration are within a time interval associated with a traffic burst of a communication, and
  the first SPS configuration and the second SPS configuration include variable SPS parameters;
obtaining an indication that activates or deactivates at least one periodic resource, of the one or more first periodic resources or the one or more second periodic resources; and
performing the communication in accordance with the indication.

26. The method of claim 25, wherein a periodic resource, of the one or more second periodic resources, occurs before the one or more first periodic resources and within the time interval, or after the one or more first periodic resources and within the time interval.

27. The method of claim 25, wherein the indication comprises:
a first indication associated with the first SPS configuration, and
a second indication associated with the second SPS configuration.

28. A method of wireless communication performed by a network node, comprising:
transmitting configuration information indicating a first semi-persistent scheduling (SPS) configuration and a second SPS configuration, wherein:
  one or more first periodic resources defined by the first SPS configuration and one or more second periodic resources defined by the second SPS configuration are within a time interval associated with a traffic burst of a communication, and
  the first SPS configuration and the second SPS configuration include variable SPS parameters; and
transmitting an indication that activates or deactivates at least one periodic resource, of the one or more first periodic resources or the one or more second periodic resources.

29. The method of claim 28, wherein a periodic resource, of the one or more second periodic resources, occurs before the one or more first periodic resources and within the time interval, or after the one or more first periodic resources and within the time interval.

30. The method of claim 28, further comprising:
deactivating the one or more second periodic resources of the second SPS configuration after a deactivation time interval has elapsed without communicating on the one or more second periodic resources.

* * * * *